(12) United States Patent
Nakamura

(10) Patent No.: US 7,782,553 B2
(45) Date of Patent: Aug. 24, 2010

(54) IMAGING LENS

(75) Inventor: Masato Nakamura, Kawaguchi (JP)

(73) Assignee: ENPLAS Corporation, Saitama (JP)

( * ) Notice: Subject to any disclaimer, the term of this patent is extended or adjusted under 35 U.S.C. 154(b) by 0 days.

(21) Appl. No.: 12/315,171

(22) Filed: Nov. 25, 2008

(65) Prior Publication Data

US 2009/0135504 A1    May 28, 2009

(30) Foreign Application Priority Data

Nov. 28, 2007    (JP) .............................. 2007-307252

(51) Int. Cl.
*G02B 9/06* (2006.01)
(52) U.S. Cl. ...................................... 359/794; 359/754
(58) Field of Classification Search ................ 359/754, 359/755, 759, 760, 767, 768, 769, 779, 780, 359/791, 792, 794
See application file for complete search history.

(56) References Cited

U.S. PATENT DOCUMENTS

2007/0121221 A1*    5/2007    Kim ........................... 359/794

2008/0037139 A1*    2/2008    Saito .......................... 359/794

FOREIGN PATENT DOCUMENTS

| EP | 1 650 591 | 4/2006 |
|----|-----------|--------|
| EP | 1 791 012 | 5/2007 |
| EP | 1 887 400 | 2/2008 |
| JP | H4-211214 | 8/1992 |
| JP | 2003-107344 | 4/2003 |
| JP | 2004-62014 | 2/2004 |

\* cited by examiner

*Primary Examiner*—Darryl J Collins
(74) *Attorney, Agent, or Firm*—William L. Androlia; H. Henry Koda

(57) ABSTRACT

It is to provide an imaging lens that has excellent optical performance while being compact and light. The imaging lens includes, in order from an object side to an image surface side, a diaphragm, a first lens that is a meniscus lens having a positive power whose convex surface faces the object side, and a second lens that is a meniscus lens having a positive power whose convex surface faces the image surface side, wherein a condition expressed by $-30.5 \leq r_3/d_3 \leq -19$ (where, $r_3$: center radius curvature of the object side face of the second lens, and $d_3$: center thickness of the second lens is to be satisfied.

3 Claims, 25 Drawing Sheets

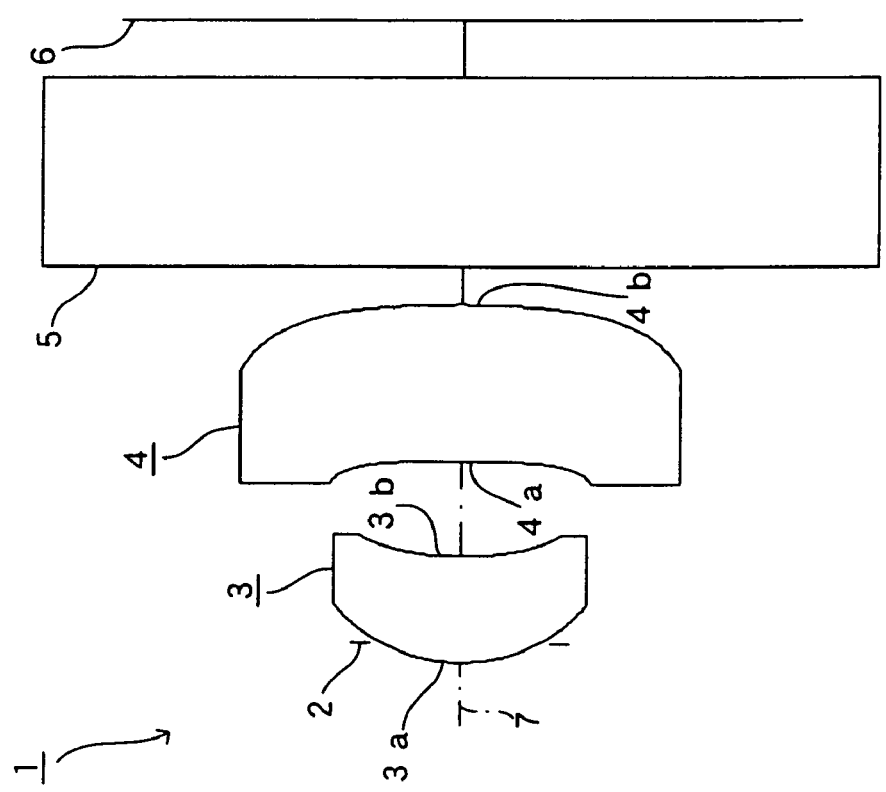

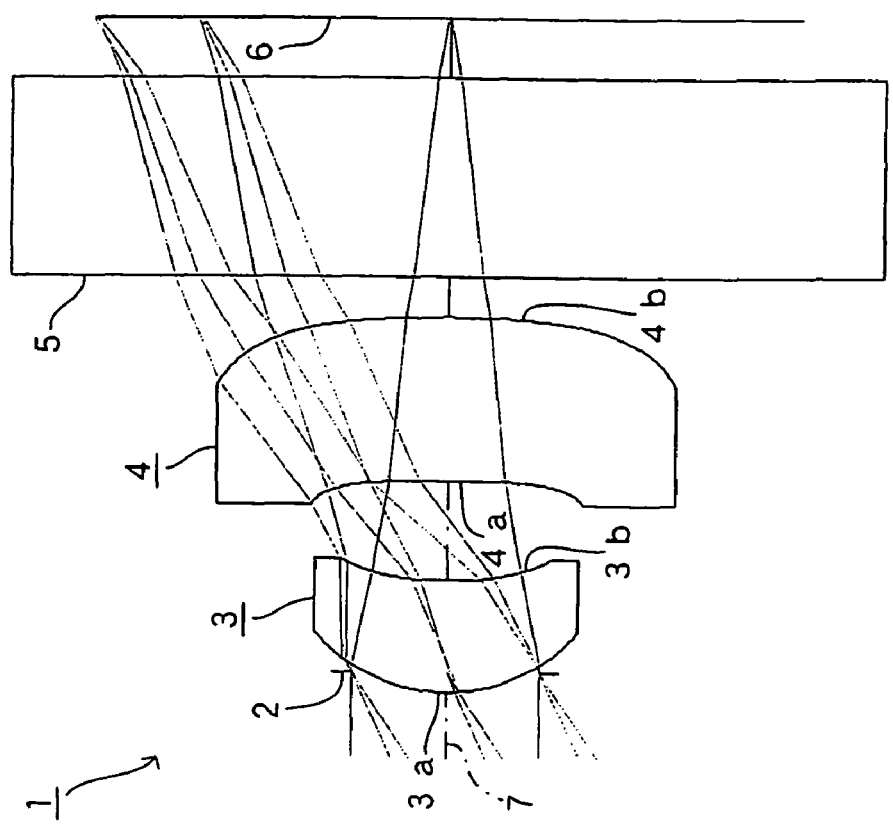
[Fig.2]

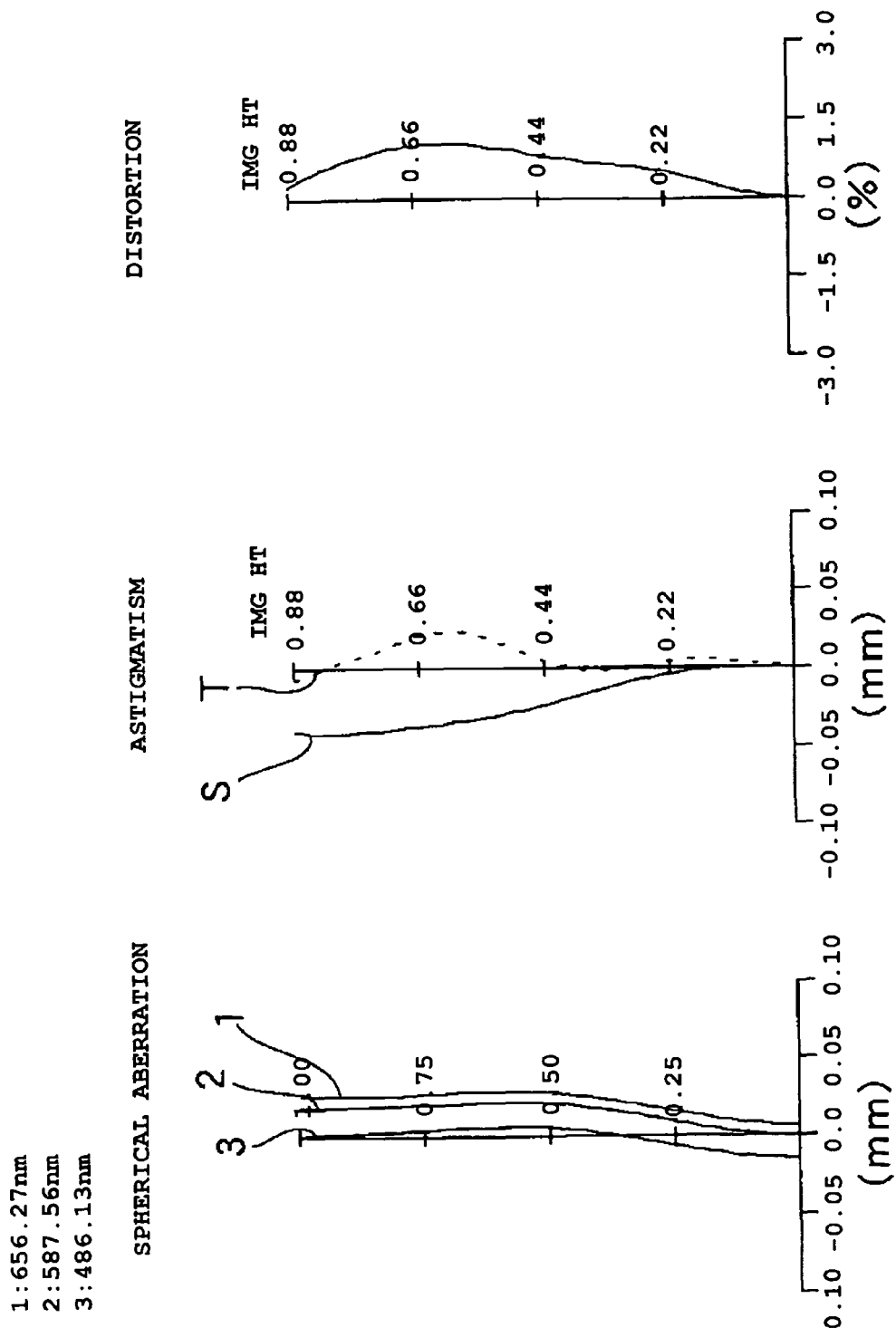

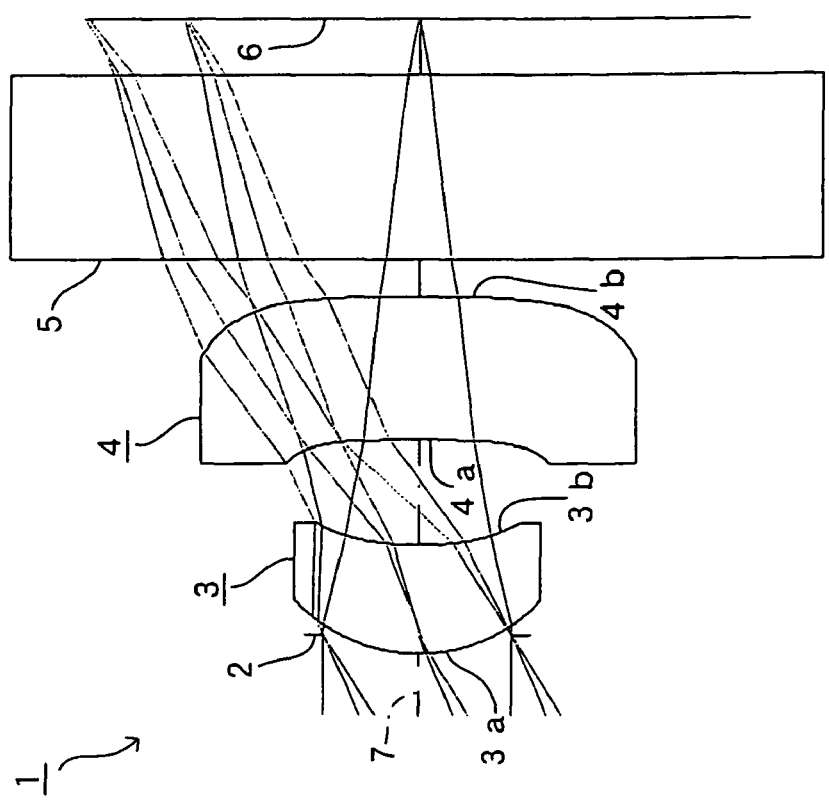
[Fig.4]

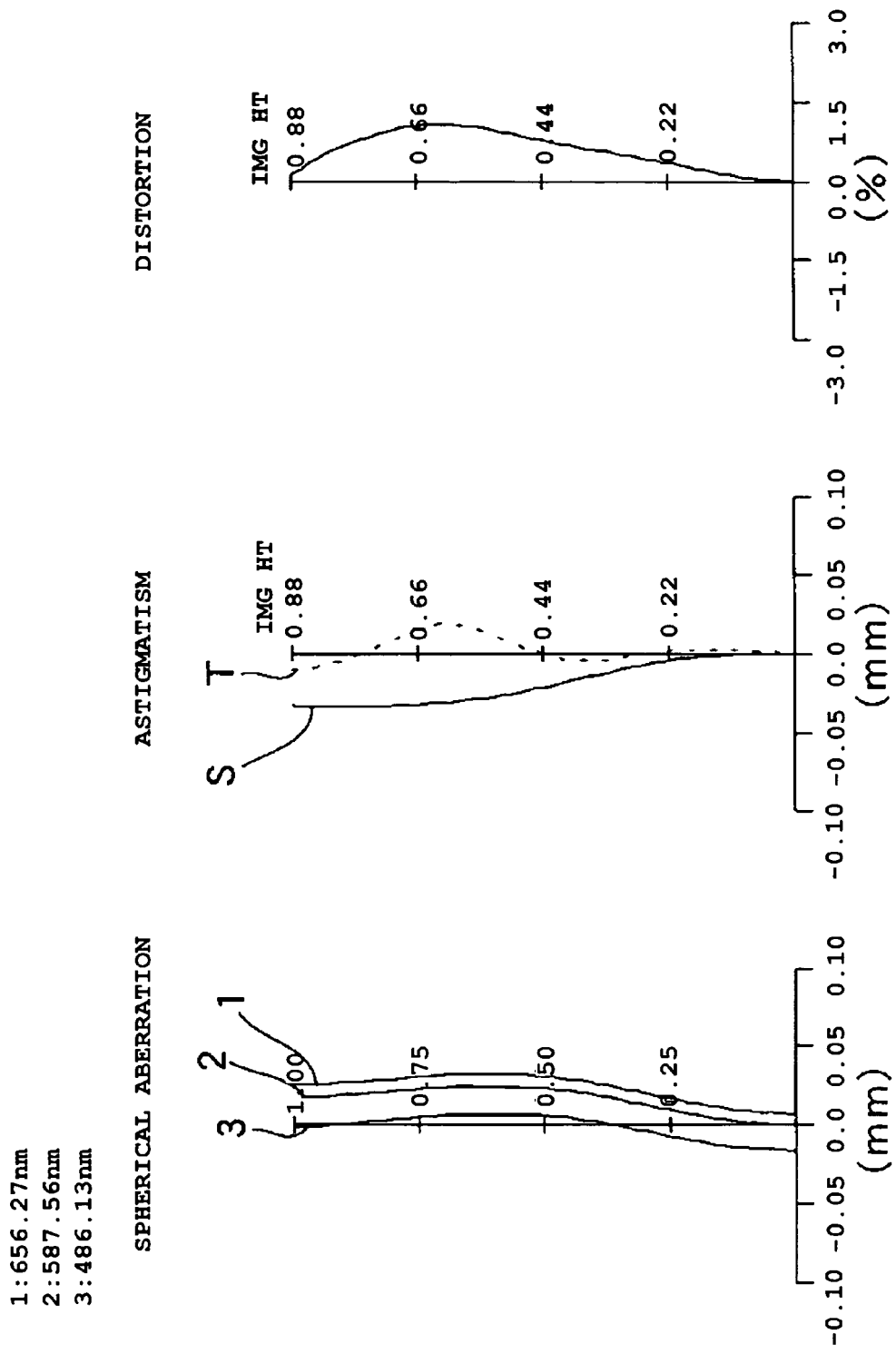

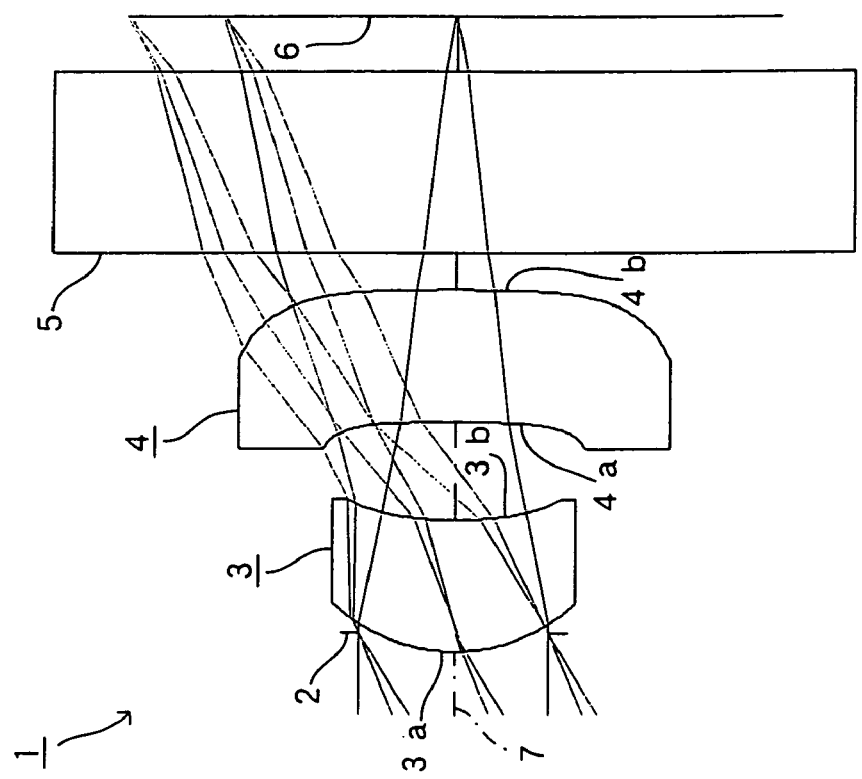
[Fig.6]

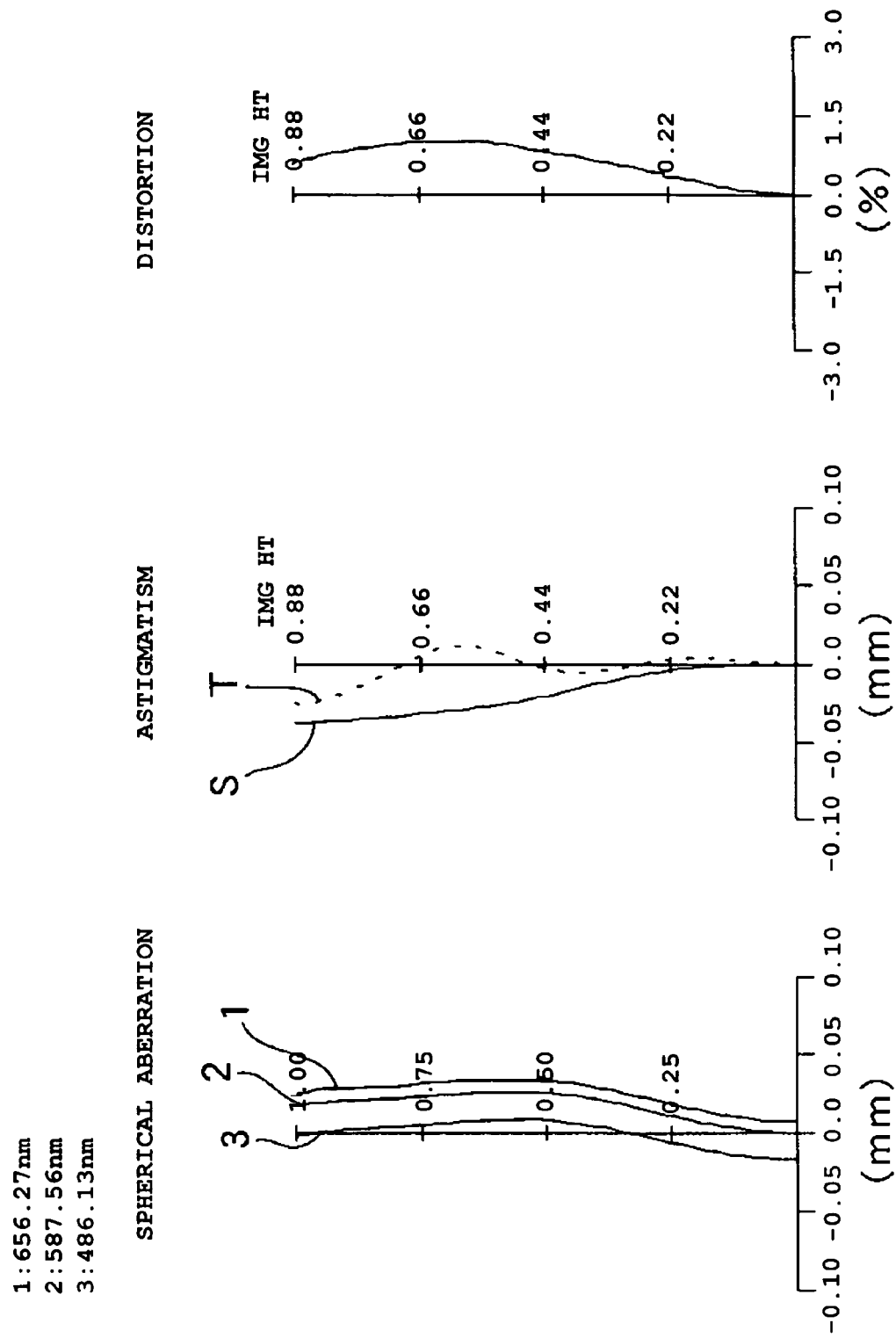

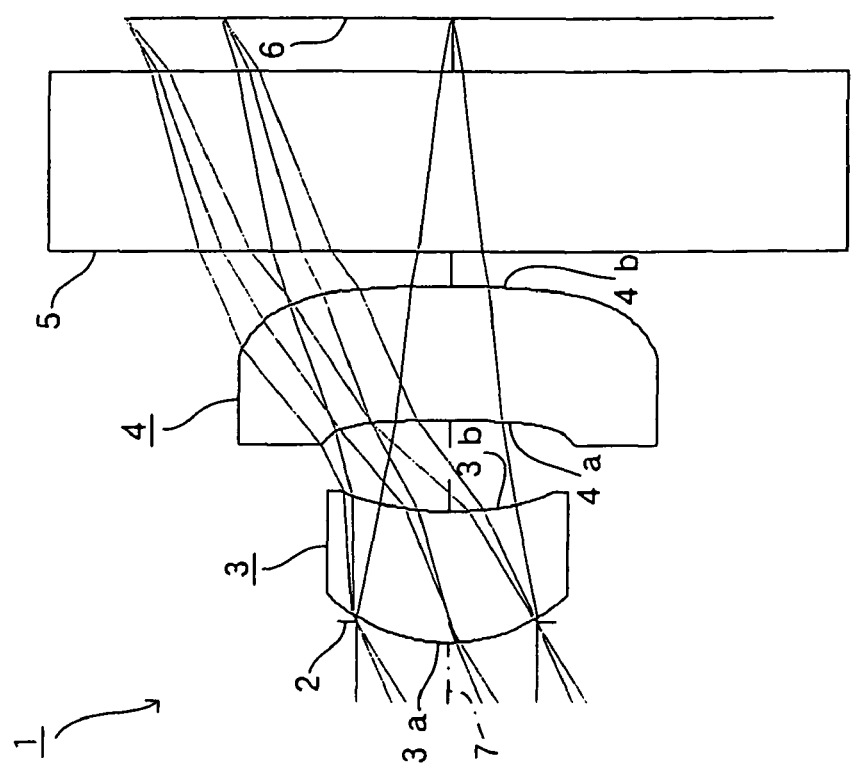
[Fig.8]

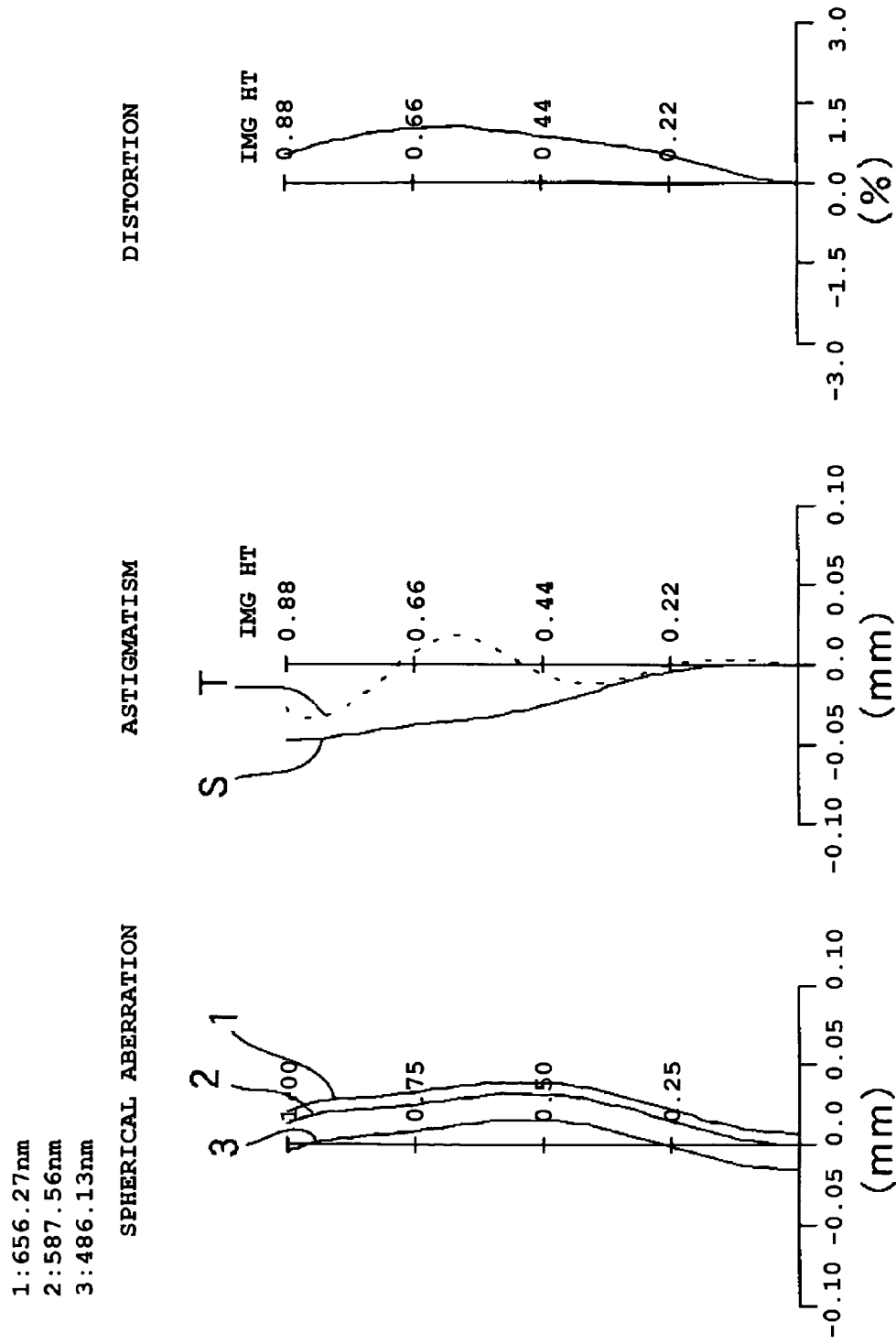

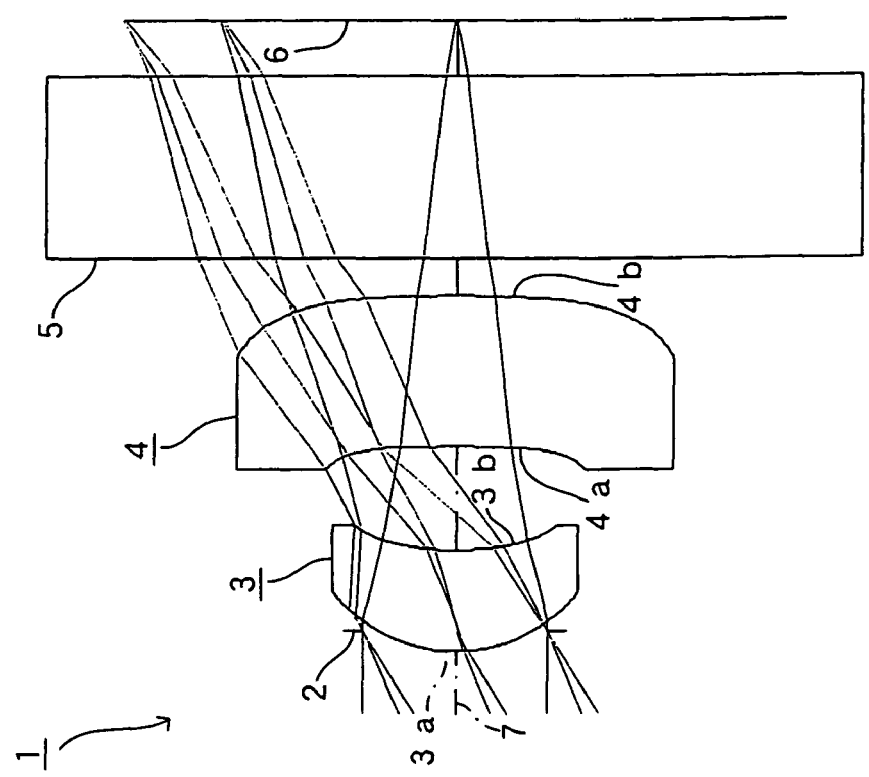
[Fig.10]

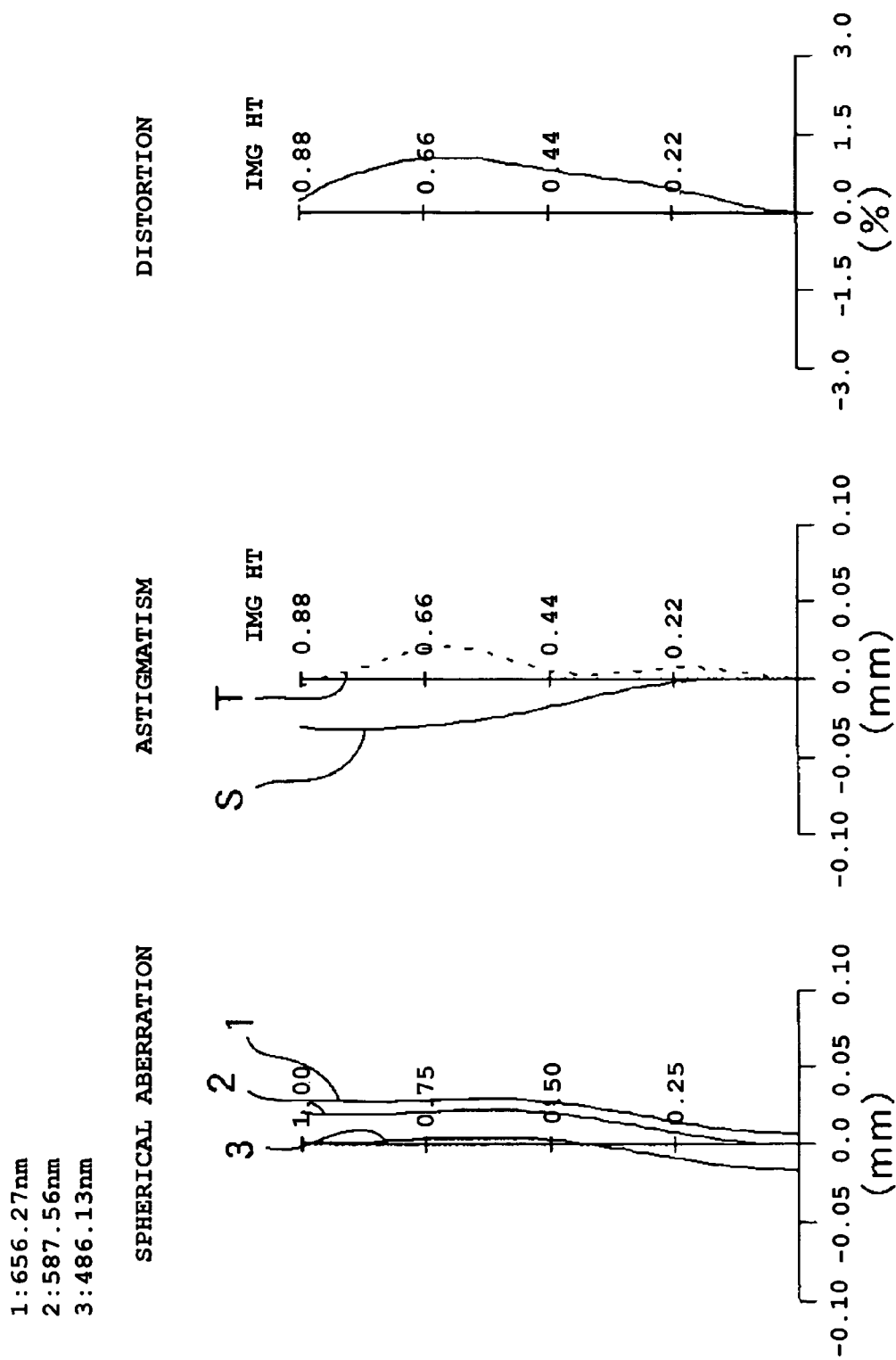

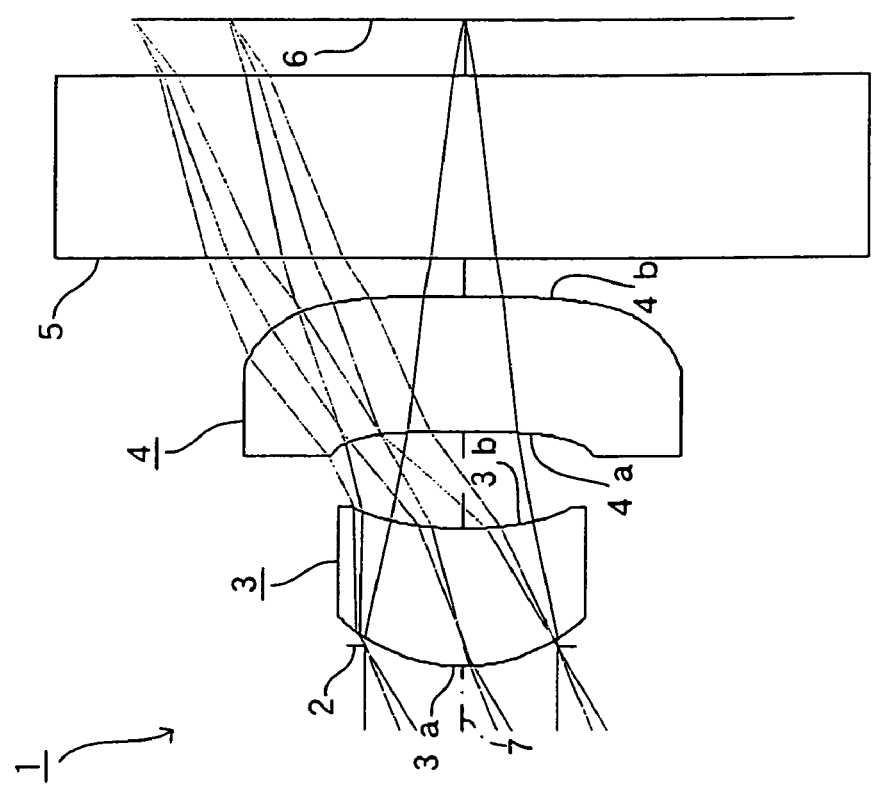
[Fig.12]

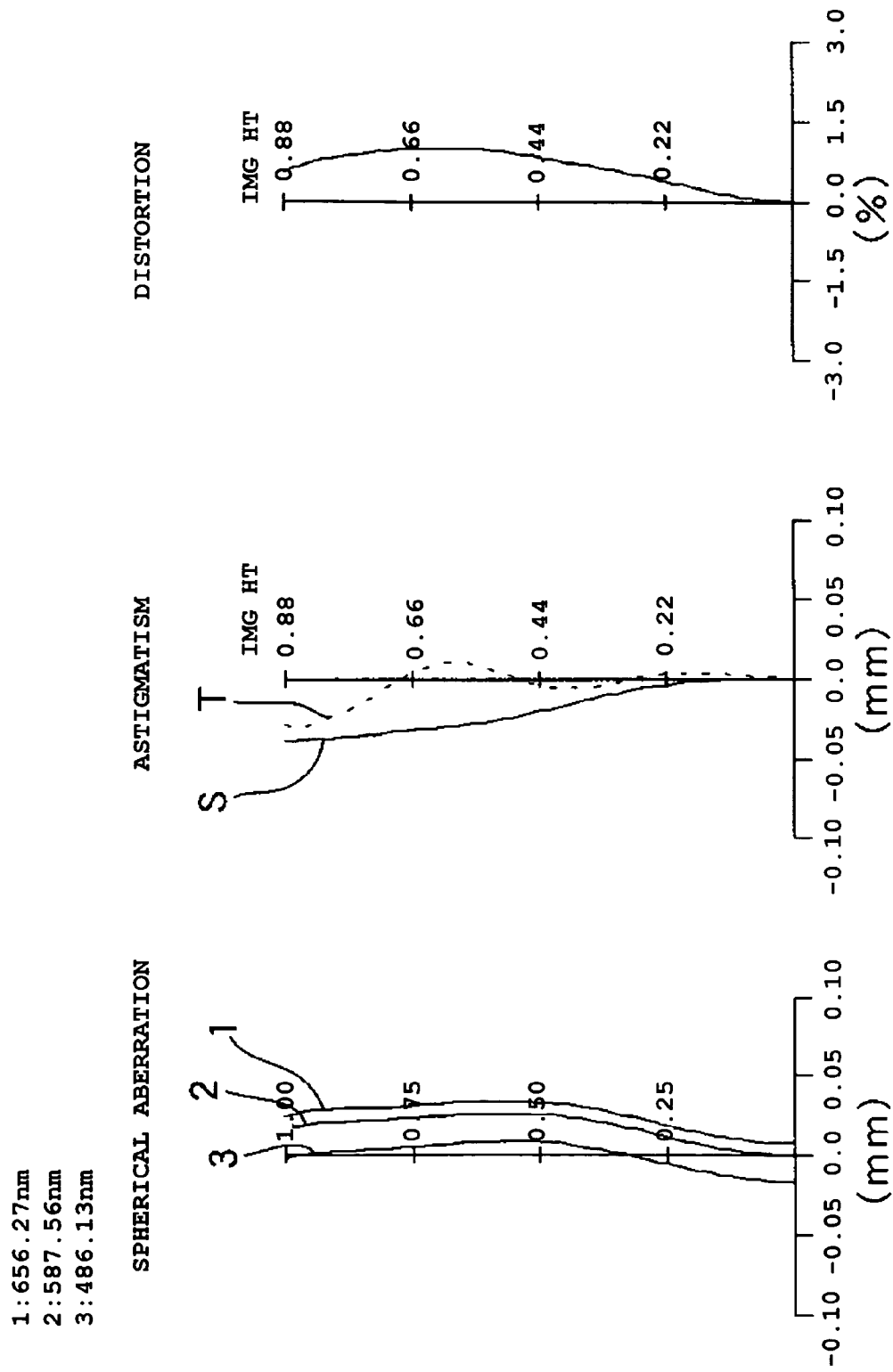

[Fig.14]
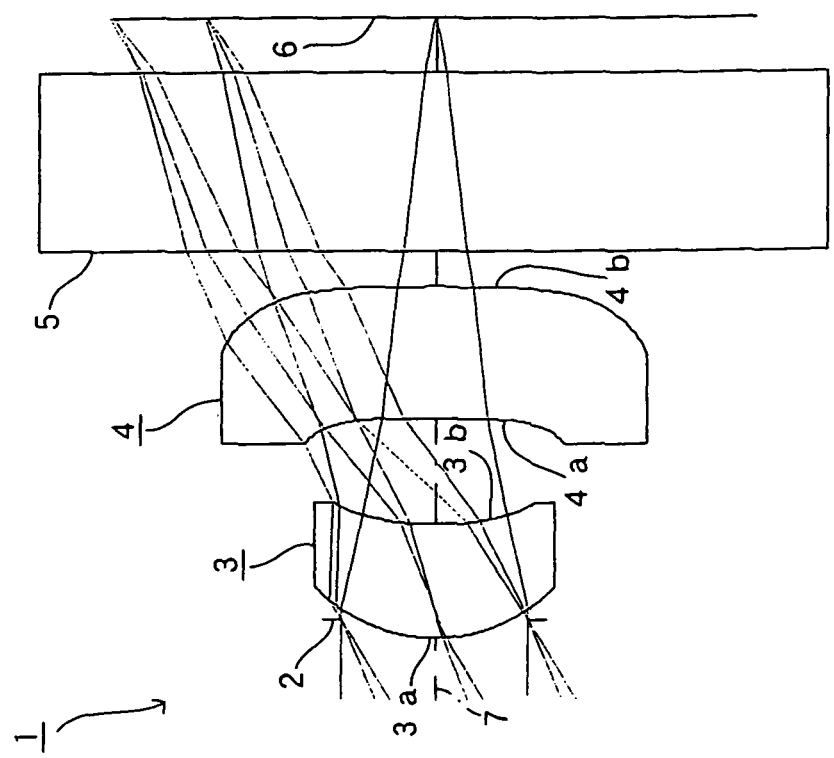

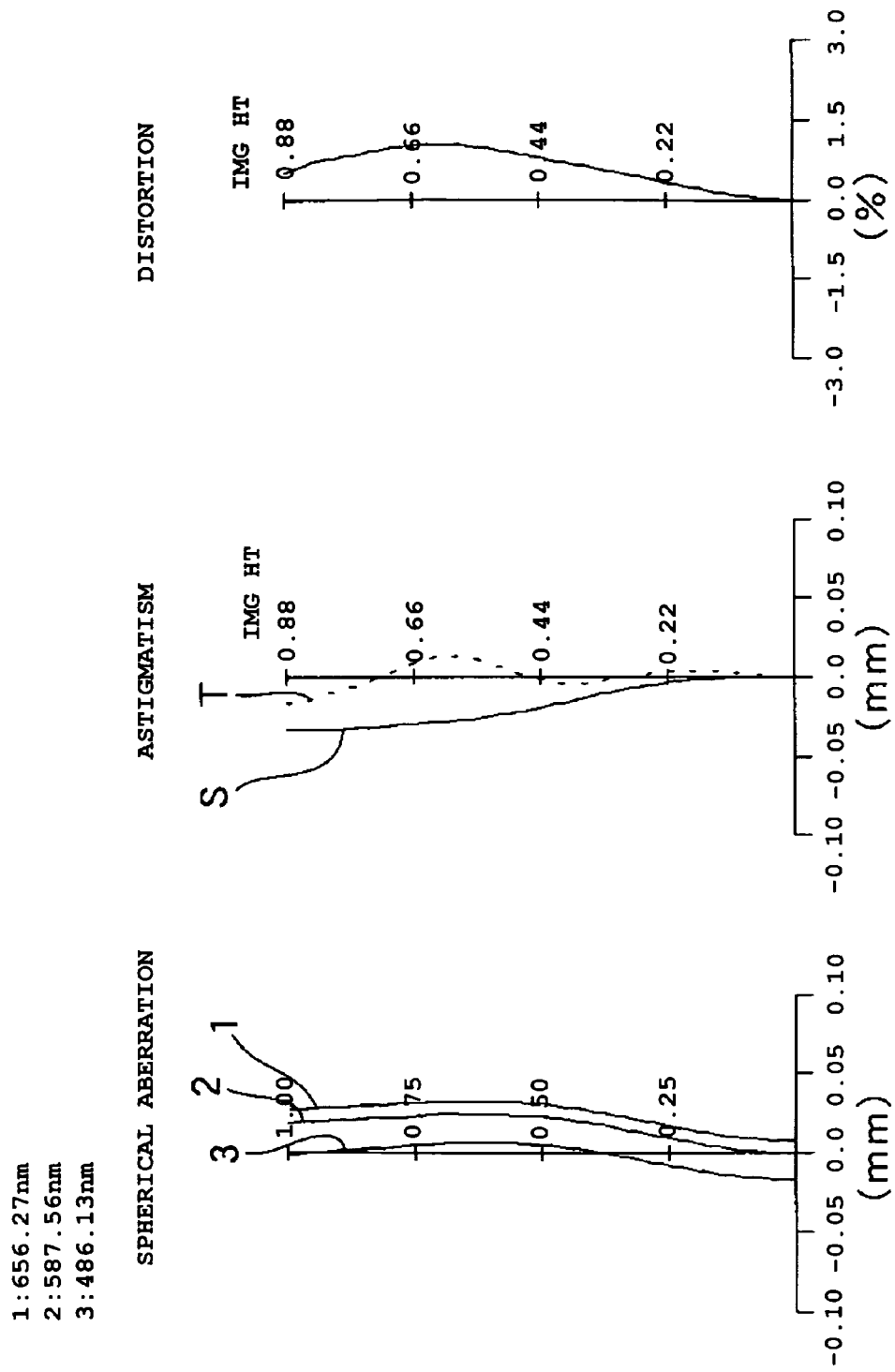

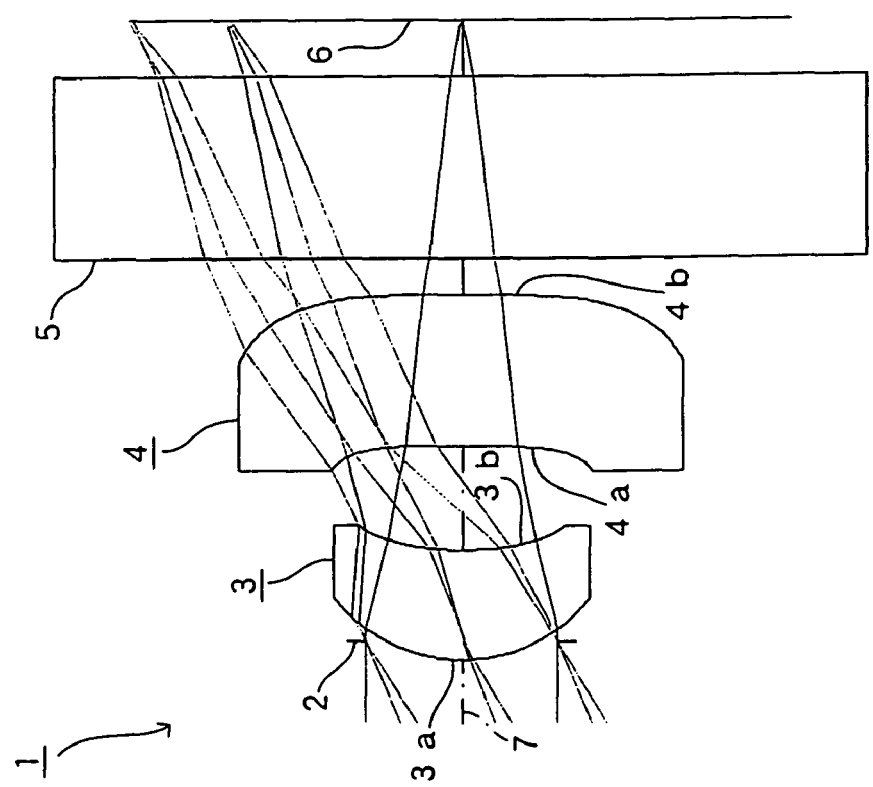
[Fig.16]

[Fig.17]
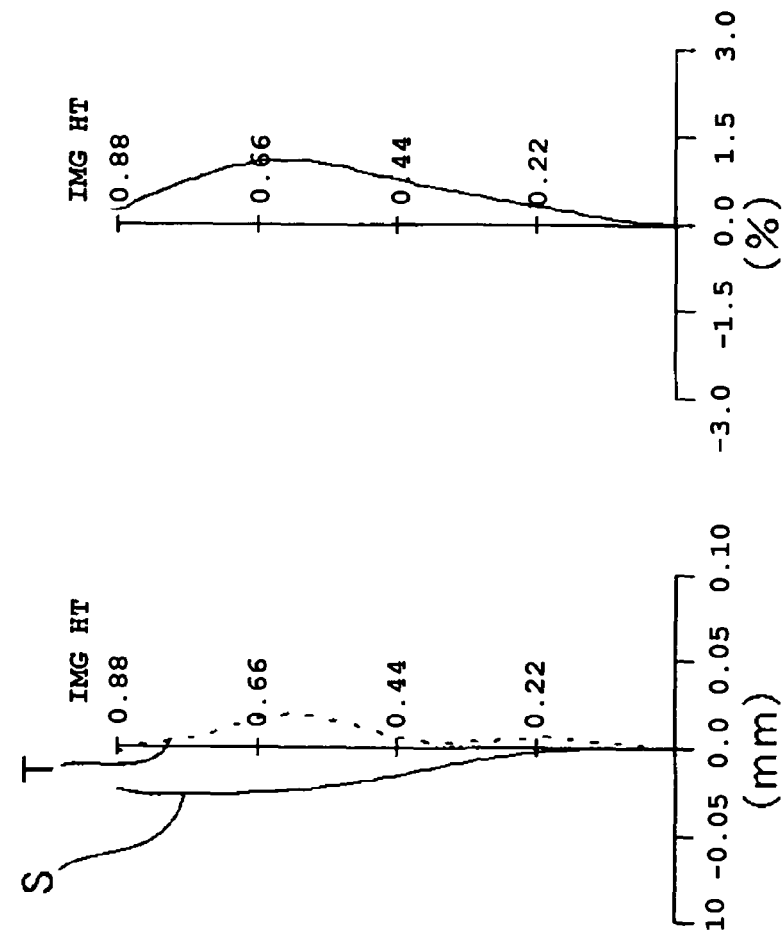

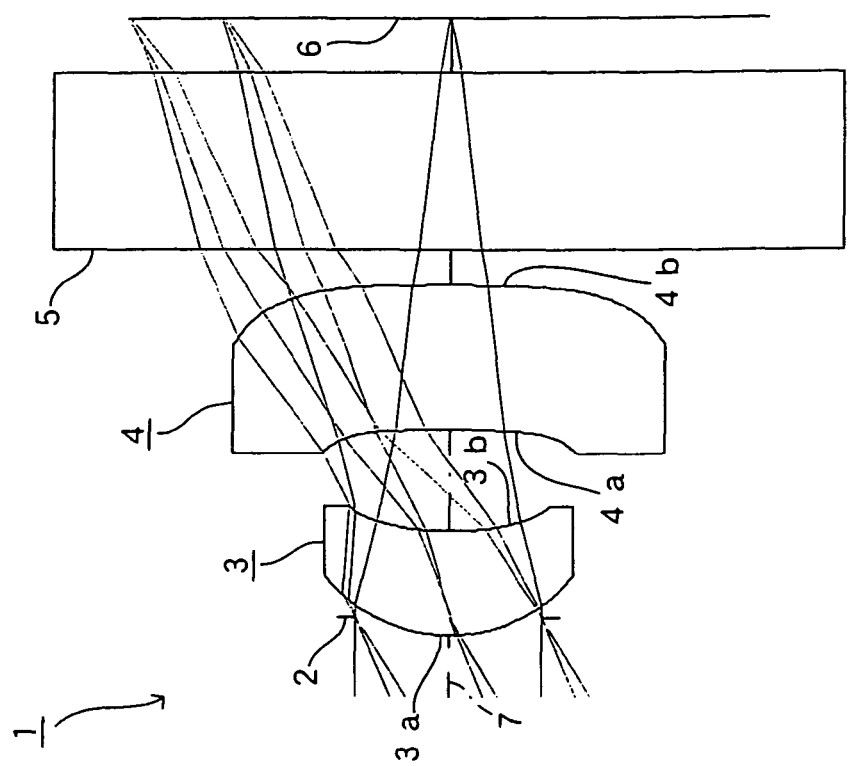
[Fig.18]

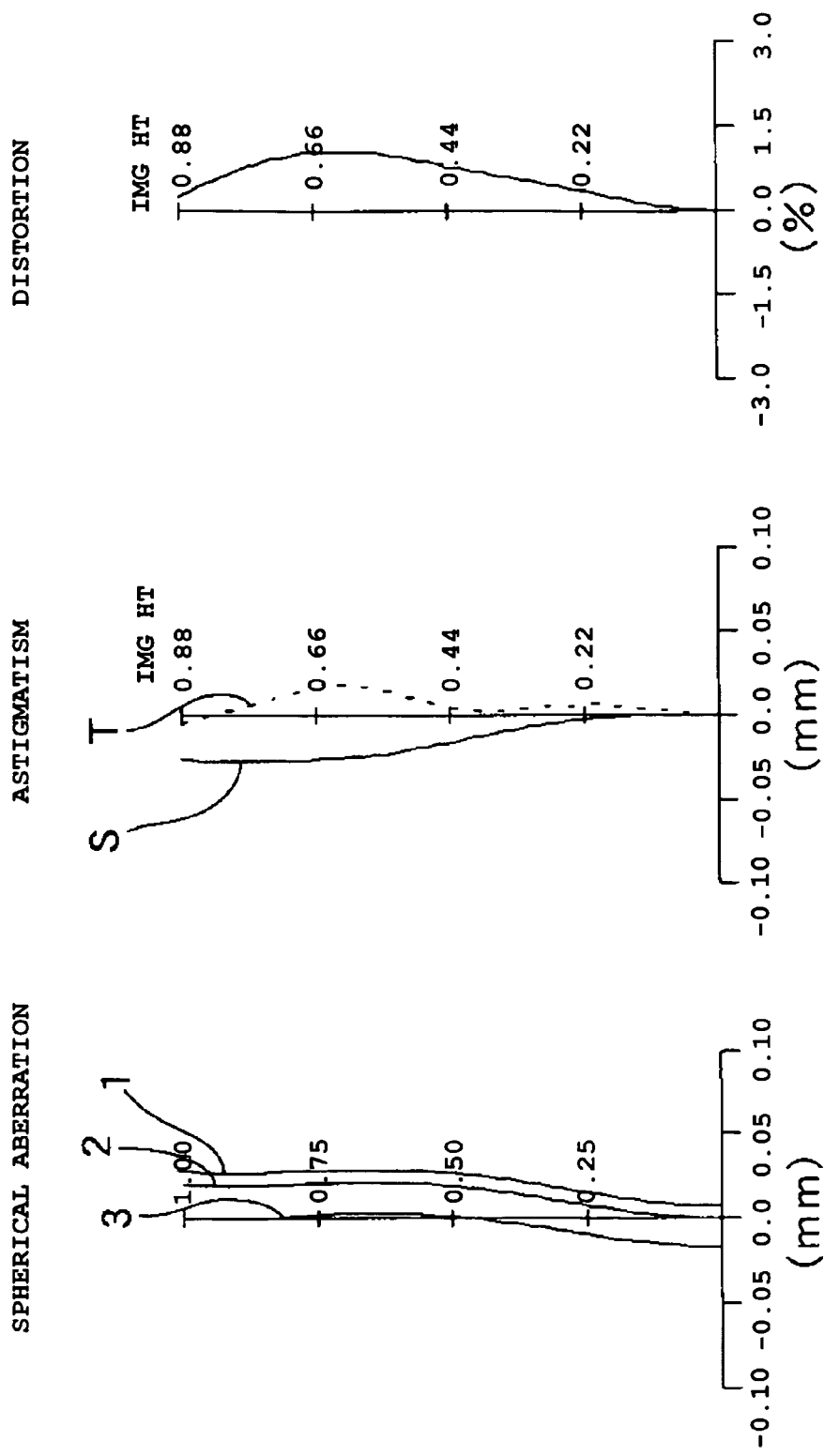

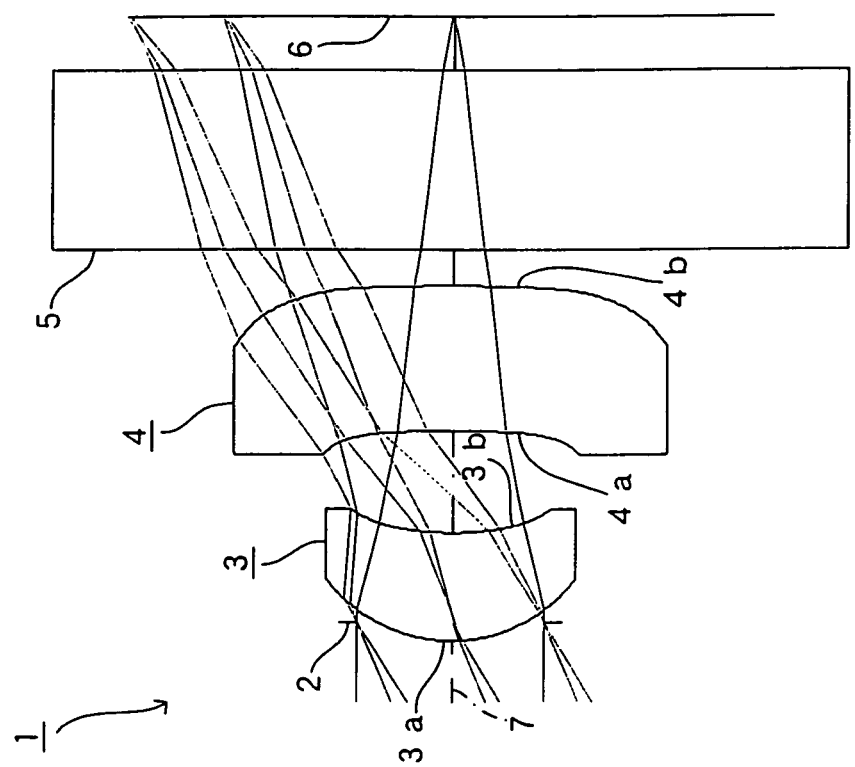

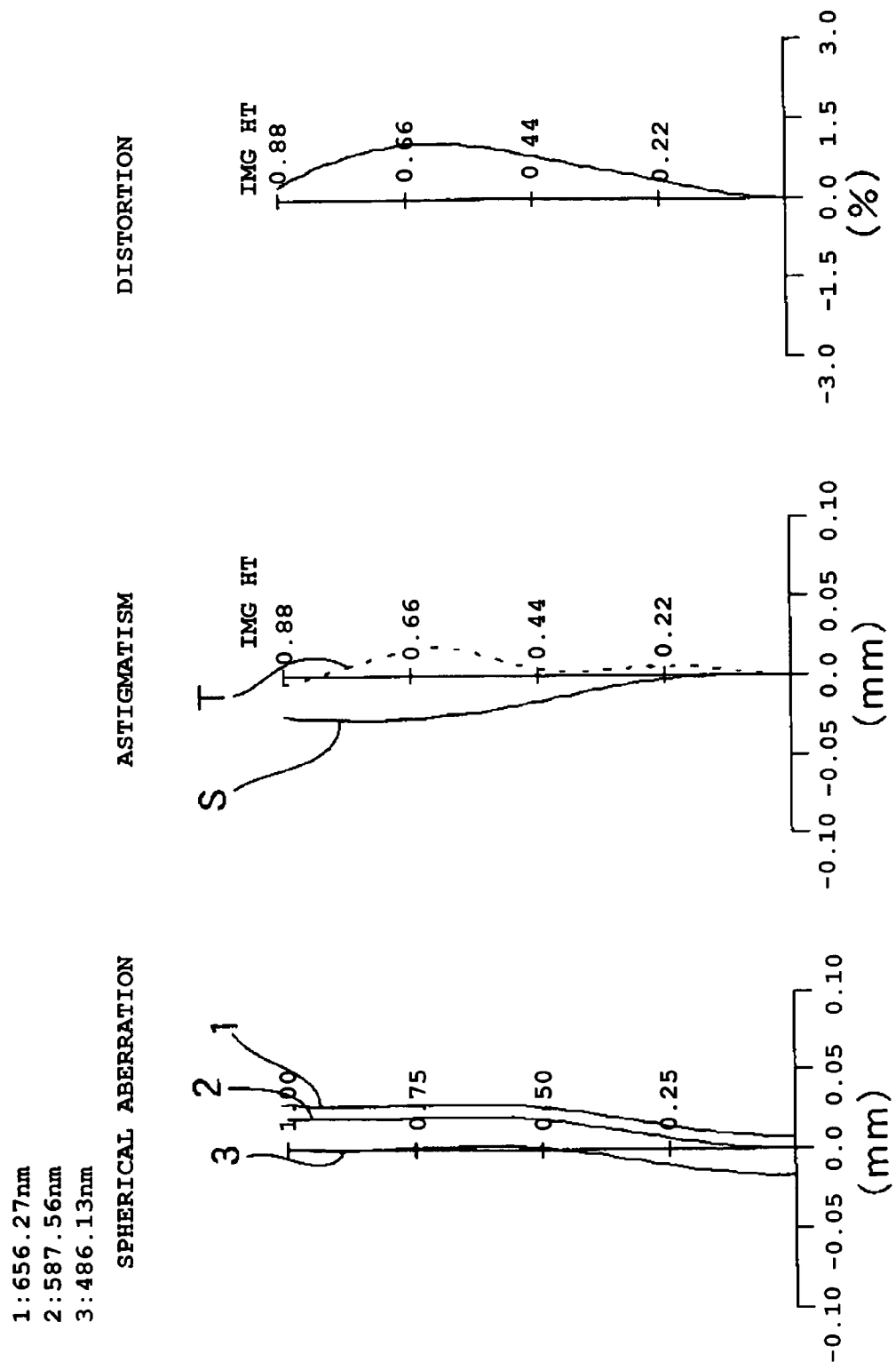

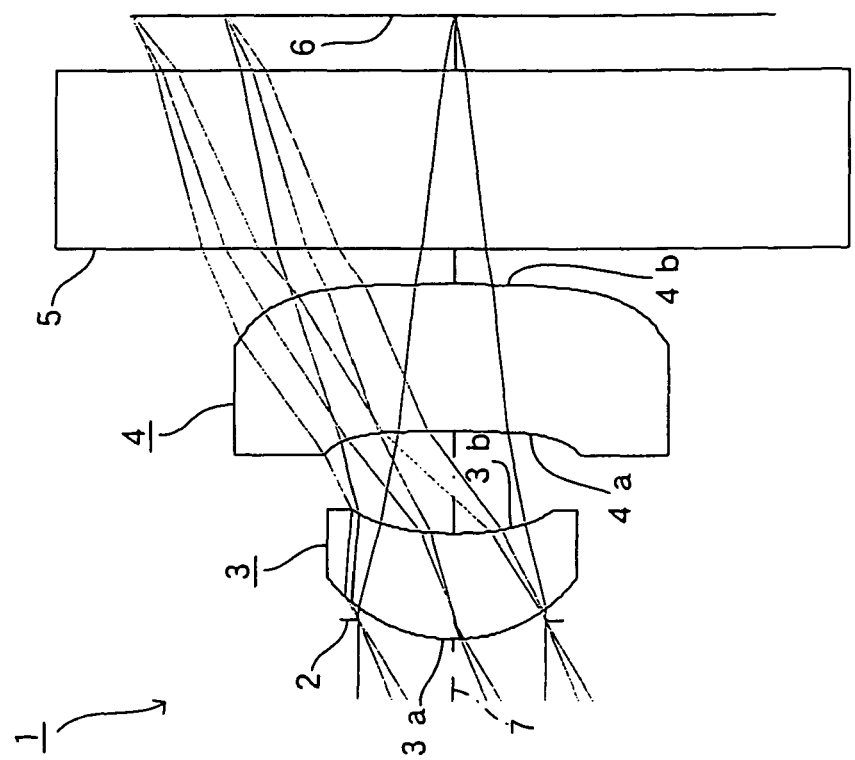
[Fig.22]

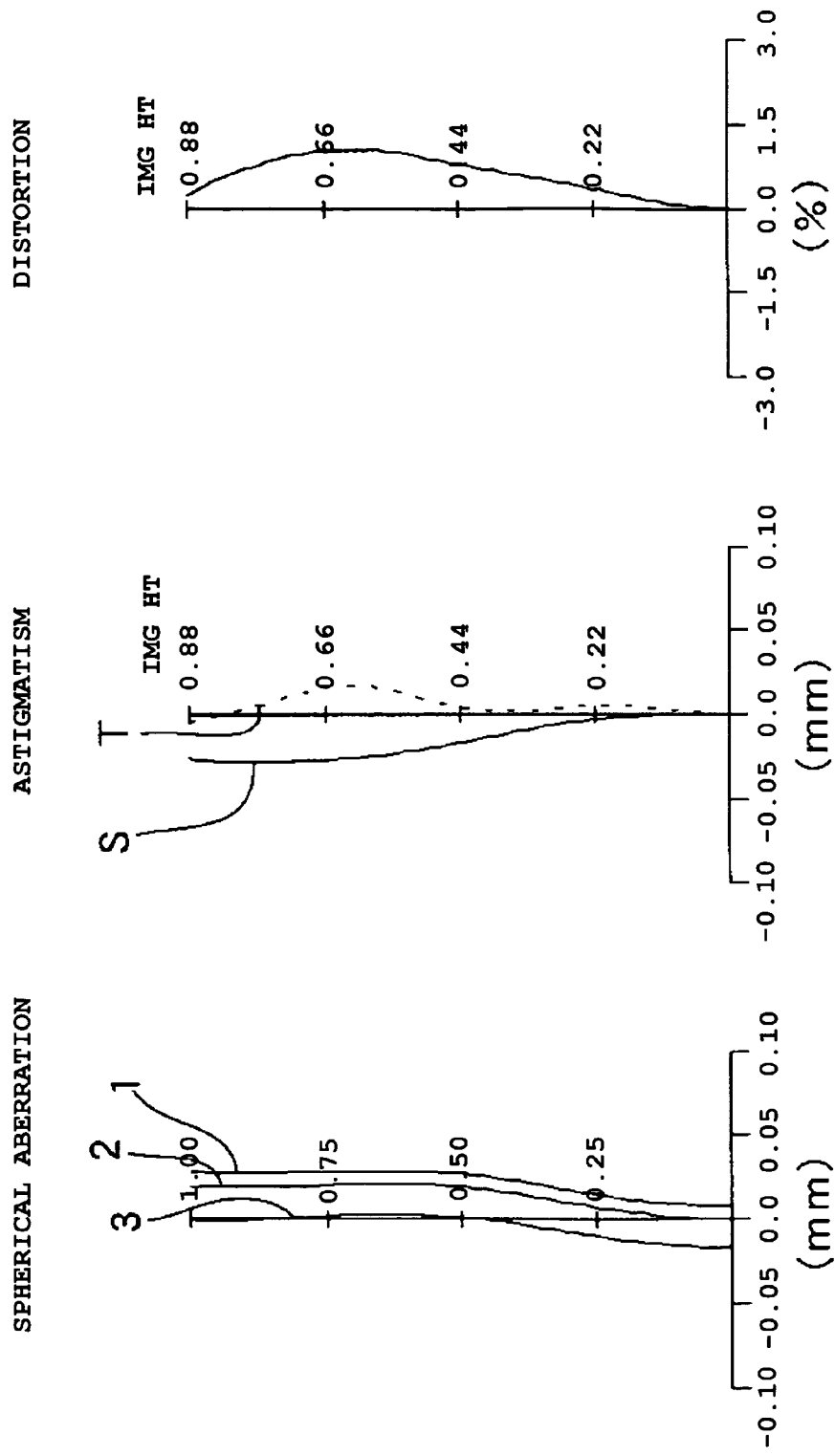

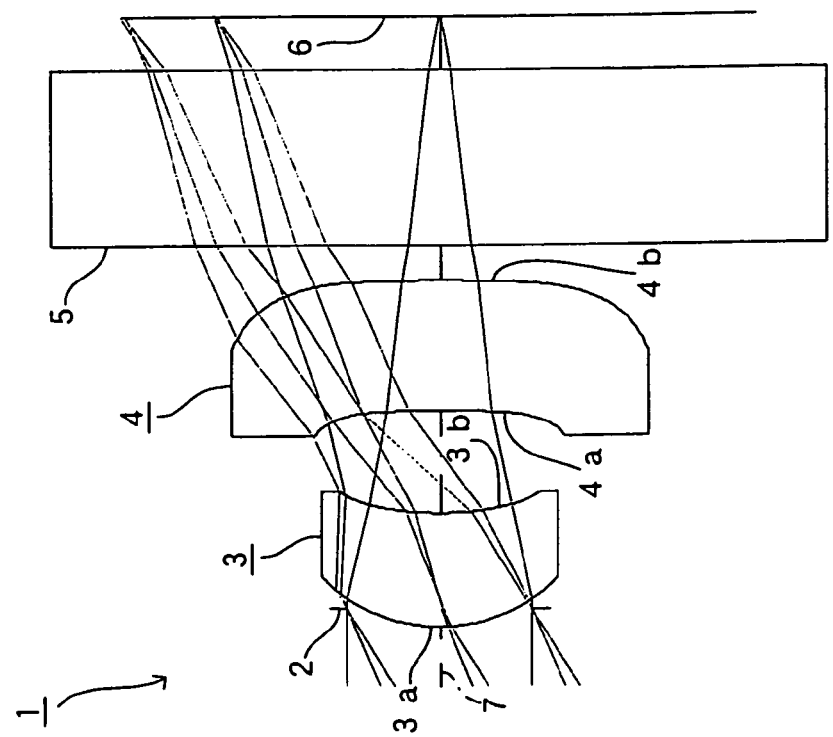
[Fig.24]

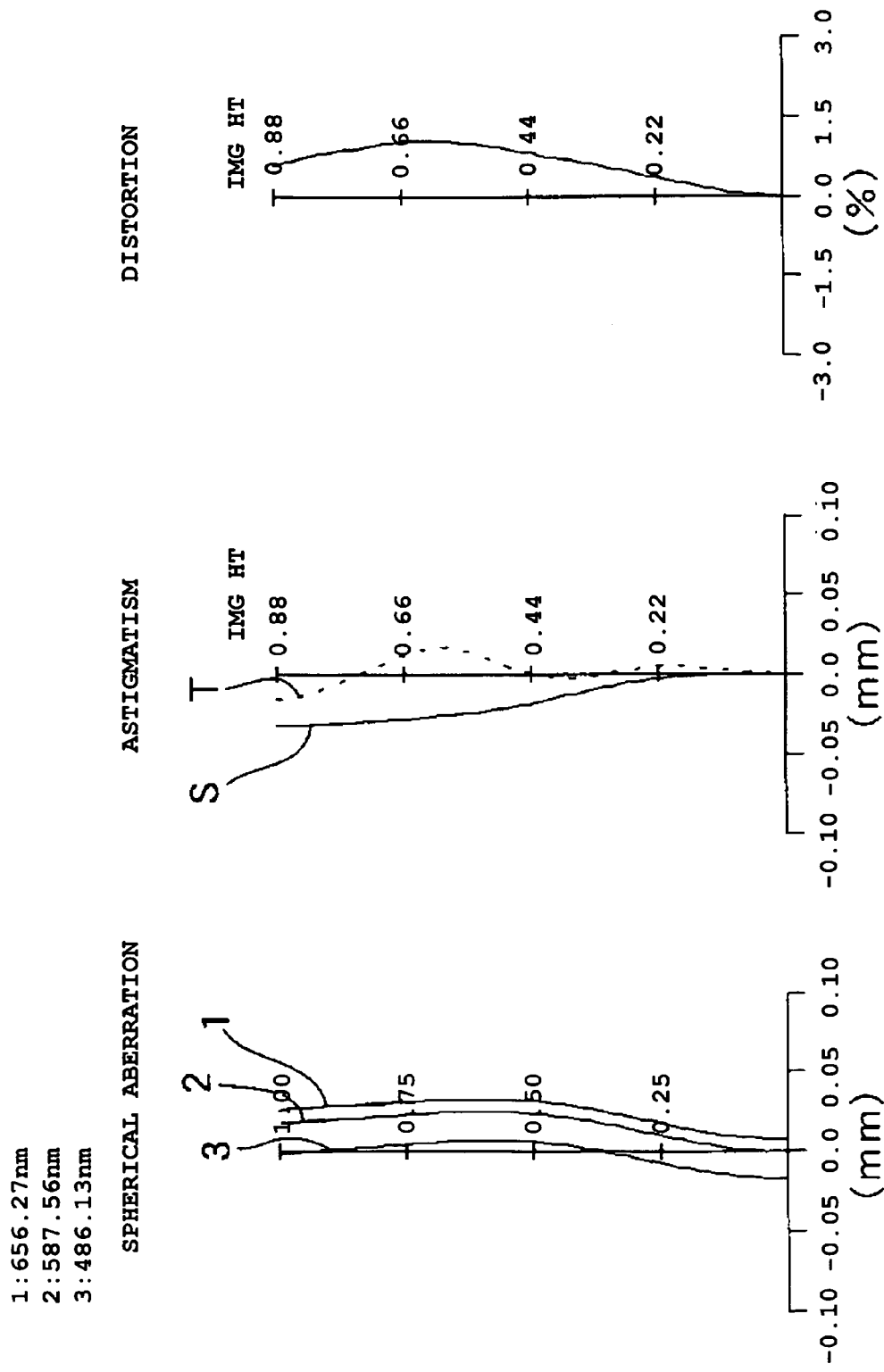

IMAGING LENS

BACKGROUND OF THE INVENTION

1. Field of the Invention

The present invention relates to an imaging lens. In particular, the present invention relates to an imaging lens having a two-lens structure suitable for size and weight reduction, and improved optical performance. The imaging lens is used in a camera that forms an image of an object, such as scenery and human figures, on an image-taking surface of an image sensor element, such as a charge-coupled device (CCD) and a complementary metal oxide semiconductor (CMOS), mounted on a portable computer, a television phone, a portable phone, and the like.

2. Description of the Related Art

In recent years, there has been an increasing demand for cameras utilizing a solid image sensor element, such as the CCD and the CMOS, that are mounted on a portable phone, a portable computer, a television phone, and the like. It is demanded that a camera such as this be small and light because the camera is required to be mounted on a limited installation space.

Therefore, an imaging lens used in a camera such as this is also required to be similarly small and light. Conventionally, a single-lens structure lens system using a single lens has been used as such an imaging lens.

However, although a single-lens structure lens system such as this is optimal for size and weight reduction, the lens system cannot sufficiently utilize the resolution capabilities of recent solid image sensor elements (such as SXGA) having a high resolution of one million pixels or more.

At the same time, in a three-lens structure lens system, an extremely high optical performance can be achieved because each aberration leading to deterioration of optical performance can be effectively corrected. However, a three-lens structure lens system such as this has a large number of components, making size and weight reduction difficult. Production cost also increases because each component requires high precision.

On the other hand, although optical performance that is as high as that of the three-lens structure lens system cannot be expected of the two-lens structure lens system, a higher optical performance than that of the single-lens structure lens system can be achieved. The two-lens structure lens system is compact and suitable for a high-resolution solid image sensor element.

As a two-lens structure lens system such as this, for example, the lens systems described in the following Patent Literatures 1, 2, and 3 have been used.

[Patent Literature 1]

Japanese Patent Unexamined Publication No. Heisei 4-211214

[Patent Literature 2]

Japanese Patent Unexamined Publication No. 2003-107344

[Patent Literature 3]

Japanese Patent Unexamined Publication No. 2004-62014

However, in the lens system described in Patent Literature 1, a second lens is a meniscus lenses having little power whose convex surface faces an object side. Therefore, correction of magnification chromatic aberration is difficult.

In the lens system described in Patent Literature 2, a first lens has negative power. Therefore, size and weight reduction is difficult. Moreover, a diaphragm is disposed on an image surface side of a second lens. Therefore, telecentricity is poor.

In the lens system described in Patent Literature 3, although a diaphragm is disposed closest to the object side, a second lens has a strong concave surface on an image surface side. Therefore, telecentricity is poor.

SUMMARY OF THE INVENTION

The present invention has been achieved in light of the above-described problems. An object of the invention is to provide an imaging lens that has excellent optical performance while being compact and light.

In order to achieve the aforementioned object, an imaging lens according to a first aspect of the present invention is an imaging lens used for forming an image of an object on an image-taking surface of an image sensor element comprising, in order from an object side to an image surface side: a diaphragm, a first lens that is a meniscus lens having a positive power whose convex surface faces the object side, and a second lens that is a meniscus lens having a positive power whose convex surface faces the image surface side, wherein a condition expressed by the following expression (1) is to be satisfied:

$$-30.5 \leq r_3/d_3 \leq -19 \quad (1)$$

where, $r_3$: center radius curvature of the object side face of the second lens $d_3$: center thickness of the second lens.

In the first aspect of the invention, the first lens is a meniscus lens having a positive power whose convex surface faces the object side. The second lens is a meniscus lens having a positive power whose convex surface faces the image surface side. In addition, the condition expressed by the expression (1) is satisfied. Therefore, size and weight can be reduced, and various aberrations, such as magnification chromatic aberration, can be successfully corrected.

An imaging lens according to a second aspect is the imaging lens according to the first aspect, wherein, further, a condition expressed by a following expression (2) is to be satisfied:

$$-11.5 \leq r_3/r_2 \leq -7 \quad (2)$$

where, $r_2$: center radius curvature of the image surface side face of the first lens.

In the second aspect of the present invention, further, the expression (2) is satisfied. Therefore, distortion can be successfully corrected.

An imaging lens according to a third aspect is the imaging lens according to the first aspect, wherein, further, a condition expressed by a following expression (3) is to be satisfied:

$$0.45 \leq r_1/r_2 \leq 0.55 \quad (3)$$

where, $r_1$: center radius curvature of the object side face of the first lens $r_2$: center radius curvature of the image surface side face of the first lens.

In the third aspect of the invention, further, the expression (3) is satisfied. Therefore, spherical aberration, astigmatism, distortion, and coma aberration can be corrected with more certainty, while achieving size and weight reduction.

An imaging lens according to a fourth aspect is the imaging lens according to any one of aspects 1 to 3, wherein, further, a condition expressed by a following expression (4) is to be satisfied:

$$0.9 \leq f_1/F \leq 1.1 \quad (4)$$

where, $f_1$: focal distance of the first lens

F: focal distance of the entire optical system.

In the fourth aspect of the present invention, further, the expression (4) is satisfied. Therefore, both size and weight reduction and improved performance can be achieved with more certainty.

EFFECT OF THE INVENTION

According to the invention, an imaging lens that has excellent optical performance, while being compact and light, can be provided.

BRIEF DESCRIPTION OF THE DRAWINGS

FIG. 1 is a schematic diagram for showing an embodiment of an imaging lens and an imaging device according to the present invention;

FIG. 2 is a schematic diagram for showing a FIRST-EXAMPLE of the imaging lens and the imaging device according to the present invention;

FIG. 3 shows graphs for describing the spherical aberration, astigmatism, and distortion of the imaging lens shown in FIG. 2;.

FIG. 4 is a schematic diagram for showing a SECOND EXAMPLE of the imaging lens and the imaging device according to the present invention;

FIG. 5 shows graphs for describing the spherical aberration, astigmatism, and distortion of the imaging lens shown in FIG. 4;

FIG. 6 is a schematic diagram for showing a THIRD EXAMPLE of the imaging lens and the imaging device according to the present invention;

FIG. 7 shows graphs for describing the spherical aberration, astigmatism, and distortion of the imaging lens shown in FIG. 6;

FIG. 8 is a schematic diagram for showing a FOURTH EXAMPLE of the imaging lens and the imaging device according to the present invention;

FIG. 9 shows graphs for describing the spherical aberration, astigmatism, and distortion of the imaging lens shown in FIG. 8;

FIG. 10 is a schematic diagram for showing a FIFTH EXAMPLE of the imaging lens and the imaging device according to the present invention;

FIG. 11 shows graphs for describing the spherical aberration, astigmatism, and distortion of the imaging lens shown in FIG. 10;

FIG. 12 is a schematic diagram for showing a SIXTH EXAMPLE of the imaging lens and the imaging device according to the present invention;

FIG. 13 shows graphs for describing the spherical aberration, astigmatism, and distortion of the imaging lens shown in FIG. 12;

FIG. 14 is a schematic diagram for showing a SEVENTH EXAMPLE of the imaging lens and the imaging device according to the present invention;

FIG. 15 shows graphs for describing the spherical aberration, astigmatism, and distortion of the imaging lens shown in FIG. 14;

FIG. 16 is a schematic diagram for showing an EIGHTH EXAMPLE of the imaging lens and the imaging device according to the present invention;

FIG. 17 shows graphs for describing the spherical aberration, astigmatism, and distortion of the imaging lens shown in FIG. 16;

FIG. 18 is a schematic diagram for showing a NINTH EXAMPLE of the imaging lens and the imaging device according to the present invention;

FIG. 19 shows graphs for describing the spherical aberration, astigmatism, and distortion of the imaging lens shown in FIG. 18;

FIG. 20 is a schematic diagram for showing a TENTH EXAMPLE of the imaging lens and the imaging device according to the present invention;

FIG. 21 shows graphs for describing the spherical aberration, astigmatism, and distortion of the imaging lens shown in FIG. 20;

FIG. 22 is a schematic diagram for showing an ELEVENTH EXAMPLE of the imaging lens and the imaging device according to the present invention;

FIG. 23 shows graphs for describing the spherical aberration, astigmatism, and distortion of the imaging lens shown in FIG. 22;

FIG. 24 is a schematic diagram for showing a TWELFTH EXAMPLE of the imaging lens and the imaging device according to the present invention; and FIG. 25 shows graphs for describing the spherical aberration, astigmatism, and distortion of the imaging lens shown in FIG. 24.

DETAILED DESCRIPTION OF THE PREFERRED EMBODIMENT

An embodiment of the imaging lens according to the present invention will be described hereinafter with reference to FIG. 1.

As shown in FIG. 1, an imaging lens 1 according to the embodiment comprises, in order from the object side toward the image surface side, a diaphragm 2, a first lens 3 that is a meniscus lens having a positive power whose convex surface faces the object side, and a second lens 4 that is a meniscus lens having a positive power whose convex surface faces the image surface side.

Each lens 3 and lens 4 is formed from resin material, such as cyclo-olefin copolymers, cycle-olefin polymers, and polycarbonate, using an injection-molding method. Preferably, each lens 3 and lens 4 is formed using a heat-resistant resin, such as silicon resin. As a result, heat-resistance can be ensured when the imaging lens 1 is mounted on a circuit board with a solid image sensor element by reflow soldering.

Hereafter, respective lens surfaces of the first lens 3 and the second lens 4 on the object side are referred to as a first face 3a and a first face 4a. Respective lens surfaces of the first lens 3 and the second lens 4 on the image surface side are referred to as a second face 3b and a second face 4b.

Various filters 5, such as a cover glass, an infrared (IR) cut filter, and a low-pass filter, and an image-taking surface 6 that is a light-receiving surface of an image sensor element (such as a solid image sensor element), such as a CCD or a CMOS, are disposed on the second face 4b side of the second lens 4. The filters 5 can be omitted as required When either the first lens 3 or the second lens 4 is a lens having a negative power, magnification chromatic aberration can be reduced. However, size and weight reduction and improved performance become difficult to achieve.

According to the embodiment, a condition expressed by a following expression (1) is satisfied:

$$-30.5 \leq r_3/d_3 \leq -19 \tag{1}$$

where, $r_3$ in the expression (1) is the center radius curvature of the first face 4a of the second lens 4 (the same applies hereafter). $d_3$ in the expression (1) is the center thickness of the second lens 4 (the same applies hereafter).

When the value of $r_3/d_3$ is less than the value (−30.5) shown in the expression (1), negative distortion and astigmatism increase. On the other hand, when the value of $r_3/d_3$ is greater than the value (−19) shown in the expression (1), the power of the first face 4a of the second lens 4 weakens. Magnification chromatic aberration and field curvature become difficult to correct.

Therefore, according to the embodiment, in the two-lens structure lens system having a small number of lenses, the first lens 3 is a meniscus lens having a positive power whose convex surface faces the object side, and a second lens 4 is a meniscus lens having a positive power whose convex surface faces the image surface side. The value of $r_3/d_3$ is set to satisfy the expression (1). As a result, size and weight can be reduced, and various aberrations, such as magnification chromatic aberration, can be successfully corrected.

As a result of the diaphragm 2 being disposed closest to the object side, a projection pupil position can be set at a position far from the image-taking surface 6. Therefore, telecentricity can be ensured.

The relationship between $r_3$ and $d_3$ is more preferably $-27 \leq r_3/d_3 \leq -19$.

In addition to the above-described configuration, according to the embodiment, a condition expressed by a following expression (2) is satisfied:

$$-11.5 \leq r_3/r_2 \leq -7 \qquad (2)$$

where, $r_2$ in the expression (2) is the center radius curvature of the second face 3b of the first lens 3 (the same applies hereafter).

When the value of $r_3/r_2$ is not within the range in the expression (2), distortion becomes difficult to correct.

Therefore, according to the embodiment, by the value of $r_3/r_2$ being set to satisfy the expression (2), distortion can be successfully corrected.

The relationship between $r_3$ and $r_2$ is more preferably $-10 \leq r_3/r_2 \leq -8$.

In addition to the above-described configuration, according to the embodiment, a condition expressed by a following expression (3) is satisfied:

$$0.45 \leq r_1/r_2 \leq 0.55 \qquad (3)$$

where, $r_1$ in the expression (3) is the center radius curvature of the first face 3a of the first lens 3 (the same applies hereafter).

When the value of $r_1/r_2$ is less than the value (0.45) in the expression (3), spherical aberration, coma aberration, and astigmatism become difficult to correct. At the same time, when the value of $r_1/r_2$ is greater than the value (0.55) in the expression (3), spherical aberration, coma aberration, and astigmatism become difficult to correct, and size and weight reduction becomes difficult to achieve.

Therefore, according to the embodiment, by the value of $r_1/r_2$ being set to satisfy the expression (3), spherical aberration, astigmatism, distortion, and coma aberration can be corrected with more certainty, while achieving size and weight loss.

The relationship between $r_1$ and $r_2$ is more preferably $0.47 \leq r_1/r_2 \leq 0.53$.

In addition to the above-described configuration, according to the embodiment, a condition expressed by a following expression (4) is satisfied:

$$0.9 \leq f_1/F \leq 1.1 \qquad (4)$$

where, $f_1$ in the expression (4) is the focal distance of the first lens 3. F in the expression (4) is the focal distance of the entire optical system.

When the value of $f_1/F$ is less than the value (0.9) in the expression (4), power of the first lens 3 becomes too strong. As a result, the various aberrations become difficult to correct. At the same time, when the value of $f_1/F$ is greater than the value (1.1) shown in the expression (4), the power of the first lens 3 becomes too small. As a result, size and weight reduction becomes difficult to achieve.

Therefore, according to the embodiment, by the value of $f_1/F$ being set to satisfy the expression (4), both size and weight reduction and improved performance can be achieved with more certainty.

The relationship between $f_1$ and F is more preferably $0.95 \leq f_1/F \leq 1.05$.

EXAMPLES

Next, EXAMPLES of the present invention will be described with reference to FIG. 2 to FIG. 25.

In the EXAMPLES, F no denotes F number, ω denotes half of the angle-of-view, and r denotes the radius curvature of an optical surface (center radius curvature of a lens). Further, d denotes a distance to the next optical surface, nd denotes the index of refraction of each optical system when the d line (yellow) is irradiated, and νd denotes the Abbe number of each optical system also when the d line is irradiated.

k, A, B, C, D, and E denote each coefficient in a following expression (5). Specifically, the shape of the aspherical surface of the lens is expressed by the following expression provided that the direction of an optical axis 7 is taken as the Z axis, the direction orthogonal to the optical axis 7 as the X axis, the traveling direction of light is positive, k is the constant of cone, A, B, C, D, and E are the aspherical coefficients, and r is the center radius curvature.

$$Z(X) = r^{-1}X^2/[1+\{1-(k+1)r^{-2}X^2\}^{1/2}] + AX^4 + BX^6 + CX^8 + DX^{10} + EX^{12} \qquad (5)$$

In the following EXAMPLES, reference code E used for a numerical value denoting the constant of cone and the aspherical coefficient indicates that the numerical value following E is an exponent having 10 as the base and that the numerical value before E is multiplied by the numerical value denoted by the exponent having 10 as the base. For example, −2.7566E-1 denotes $-2.7566 \times 10^{-1}$.

First Example

FIG. 2 shows an imaging lens 1 that is the same imaging lens 1 as that shown in FIG. 1 as the FIRST EXAMPLE of the present invention. In the example, a cover glass serving as the filter 5 is disposed between the second face 4b of the second lens 4 and the image-taking surface 6.

The imaging lens 1 of the FIRST EXAMPLE was set under the following conditions:

Lens Data
F = 1.346 mm, f$_1$ = 1.444 mm, F no = 2.8, ω = 66.2°

| Face Number (Object Point) | r | d | nd | vd |
|---|---|---|---|---|
| 1 (Diaphragm) | 0.000 | −0.05 | | |
| 2 (First Face of First Lens) | 0.448 | 0.28 | 1.52 | 53 |
| 3 (Second Face of First Lens) | 0.874 | 0.25 | | |
| 4 (First Face of Second Lens) | −8.514 | 0.42 | 1.52 | 53 |
| 5 (Second Face of Second Lens) | −2.563 | 0.10 | | |
| 6 (First Face of Cover Glass) | 0.000 | 0.50 | 1.5168 | 64 |
| 7 (Second Face of Cover Glass) | 0.000 | | | |

| Face Number | k | A | B | C | D | E |
|---|---|---|---|---|---|---|
| 2 | −2.7566E−1 | 1.6865E−1 | 2.0518E+1 | −2.3876E+2 | 1.6585E+3 | 0 |
| 3 | 7.2243 | 1.1053 | −3.4717E+1 | 9.3798E+2 | −1.2074E+4 | 6.9692E+4 |
| 4 | 0 | −1.6421 | 7.0287 | −6.6174E+2 | 8.8760E+3 | −4.4477E+4 |
| 5 | −2.9957E+2 | −1.6074 | 1.0138E+1 | −7.1321E+1 | 2.2437E+2 | −2.9650E+2 |

Under such conditions, $r_3/d_3 = -20.269$ was achieved, thereby satisfying the expression (1). $r_3/r_2 = -9.742$ was achieved, thereby satisfying the expression (2). $r_1/r_2 = 0.513$ was achieved, thereby satisfying the expression (3). $f_1/F = 1.072$ was achieved, thereby satisfying the expression (4).

FIG. 3 shows the spherical aberration, astigmatism, and distortion in the imaging lens 1 of the FIRST EXAMPLE.

According to the result, each of the spherical aberration, astigmatism, and distortion are almost satisfactory. It can be seen from the result that sufficient optical property can be obtained.

Second Example

FIG. 4 shows a SECOND EXAMPLE of the present invention. In the example, as in the imaging lens 1 configured as shown in FIG. 1, a cover glass serving as the filter 5 is disposed between the second face 4b of the second lens 4 and the image-taking surface 6.

The imaging lens 1 of the SECOND EXAMPLE was set under the following conditions:

Lens Data
F = 1.427 mm, f$_1$ = 1.439 mm, F no = 2.8, ω = 63.3°

| Face Number (Object Point) | r | d | nd | vd |
|---|---|---|---|---|
| 1 (Diaphragm) | 0.000 | −0.050 | | |
| 2 (First Face of First Lens) | 0.454 | 0.296 | 1.52 | 53 |
| 3 (Second Face of First Lens) | 0.896 | 0.283 | | |
| 4 (First Face of Second Lens) | −9.856 | 0.394 | 1.52 | 53 |
| 5 (Second Face of Second Lens) | −5.824 | 0.100 | | |
| 6 (First Face of Cover Glass) | 0.000 | 0.500 | 1.5168 | 64 |
| 7 (Second Face of Cover Glass) | 0.000 | | | |

| Face Number | k | A | B | C | D | E |
|---|---|---|---|---|---|---|
| 2 | −1.7139E−1 | 7.2815E−2 | 1.2903E+1 | −1.1701E+2 | 7.7082E+2 | 0 |
| 3 | 7.0837 | 1.1177 | −3.0961E+1 | 8.1132E+2 | −9.9371E+3 | 5.8772E+4 |
| 4 | 0 | −2.1103 | 2.0450E+1 | −8.4609E+2 | 9.6901E+3 | −4.2772E+4 |
| 5 | −1.4535E+3 | −1.0928 | 4.8645 | −4.4959E+1 | 1.5594E+2 | −2.2190E+2 |

Under such conditions, $r_3/d_3 = -25.000$ was achieved, thereby satisfying the expression (1). $r_3/r_2 = -11.000$ was achieved, thereby satisfying the expression (2). $r_1/r_2 = 0.507$ was achieved, thereby satisfying the expression (3). $f_1/F = 1.008$ was achieved, thereby satisfying the expression (4).

FIG. 5 shows the spherical aberration, astigmatism, and distortion in the imaging lens 1 of the SECOND EXAMPLE.

According to the result, each of the spherical aberration, astigmatism, and distortion are almost satisfactory. It can be seen from the result that sufficient optical property can be obtained.

Third Example

FIG. 6 shows a THIRD EXAMPLE of the present invention. In the example, as in the imaging lens 1 configured as shown in FIG. 1, a cover glass serving as the filter 5 is disposed between the second face 4b of the second lens 4 and the image-taking surface 6.

The imaging lens 1 of the THIRD EXAMPLE was set under the following conditions:

Lens Data
F = 1.457 mm, $f_1$ = 1.457 mm, F no = 2.8, $\omega$ = 62.0°

| Face Number (Object Point) | r | d | nd | vd |
|---|---|---|---|---|
| 1 (Diaphragm) | 0.000 | −0.050 | | |
| 2 (First Face of First Lens) | 0.484 | 0.358 | 1.52 | 53 |
| 3 (Second Face of First Lens) | 1.003 | 0.274 | | |
| 4 (First Face of Second Lens) | −11.030 | 0.368 | 1.52 | 53 |
| 5 (Second Face of Second Lens) | −7.917 | 0.100 | | |
| 6 (First Face of Cover Glass) | 0.000 | 0.500 | 1.5168 | 64 |
| 7 (Second Face of Cover Glass) | 0.000 | | | |

| Face Number | k | A | B | C | D | E |
|---|---|---|---|---|---|---|
| 2 | −2.0475E−1 | −2.2481E−1 | 1.6774E+1 | −1.9614E+2 | 1.0808E+3 | 0 |
| 3 | 4.0507 | 1.2021 | −2.3850E+1 | 7.6446E+2 | −9.2499E+3 | 5.2612E+4 |
| 4 | 0 | −2.3615 | 2.7472E+1 | −9.8123E+2 | 1.0745E+4 | −4.5097E+4 |
| 5 | −2.1169E+3 | −9.9501E−1 | 2.8154 | −3.9307E+1 | 1.6041E+2 | −2.5546E+2 |

Under such conditions, $r_3/d_3$=−30.000 was achieved, thereby satisfying the expression (1). $r_3/r_2$=−11.000 was achieved, thereby satisfying the expression (2). $r_1/r_2$=0.483 was achieved, thereby satisfying the expression (3). $f_1/F$=1.000 was achieved, thereby satisfying the expression (4).

FIG. 7 shows the spherical aberration, astigmatism, and distortion in the imaging lens 1 of the THIRD EXAMPLE.

According to the result, each of the spherical aberration, astigmatism, and distortion are almost satisfactory. It can be seen from the result that sufficient optical property can be obtained.

Fourth Example

FIG. 8 shows a FOURTH EXAMPLE of the present invention. In the example, as in the imaging lens 1 configured as shown in FIG. 1, a cover glass serving as the filter 5 is disposed between the second face 4b of the second lens 4 and the image-taking surface 6.

The imaging lens 1 of the FOURTH EXAMPLE was set under the following conditions:

Under such conditions, $r_3/d_3$=−20.003 was achieved, thereby satisfying the expression (1). $r_3/r_2$=−7.001 was achieved, thereby satisfying the expression (2). $r_1/r_2$=0.460 was achieved, thereby satisfying the expression (3). $f_1/F$=1.026 was achieved, thereby satisfying the expression (4).

FIG. 9 shows the spherical aberration, astigmatism, and distortion in the imaging lens 1 of the FOURTH EXAMPLE.

According to the result, each of the spherical aberration, astigmatism, and distortion are almost satisfactory. It can be seen from the result that sufficient optical property can be obtained.

Fifth Example

FIG. 10 shows a FIFTH EXAMPLE of the present invention. In the example, as in the imaging lens 1 configured as shown in FIG. 1, a cover glass serving as the filter 5 is disposed between the second face 4b of the second lens 4 and the image-taking surface 6.

The imaging lens 1 of the FIFTH EXAMPLE was set under the following conditions:

Lens Data
F = 1.407 mm, $f_1$ = 1.443 mm, F no = 2.8, $\omega$ = 63.8°

| Face Number (Object Point) | r | d | nd | vd |
|---|---|---|---|---|
| 1 (Diaphragm) | 0.000 | −0.050 | | |
| 2 (First Face of First Lens) | 0.492 | 0.363 | 1.52 | 53 |
| 3 (Second Face of First Lens) | 1.071 | 0.250 | | |
| 4 (First Face of Second Lens) | −7.494 | 0.375 | 1.52 | 53 |
| 5 (Second Face of Second Lens) | −3.713 | 0.100 | | |
| 6 (First Face of Cover Glass) | 0.000 | 0.500 | 1.5168 | 64 |
| 7 (Second Face of Cover Glass) | 0.000 | | | |

| Face Number | k | A | B | C | D | E |
|---|---|---|---|---|---|---|
| 2 | −9.1079E−1 | 1.8973E−1 | 3.0162E+1 | −4.0704E+2 | 2.4377E+3 | 0 |
| 3 | −3.2808 | 2.3862 | −4.8603E+1 | 1.3308E+3 | −1.5506E+4 | 7.8066E+4 |
| 4 | 0 | −1.4662 | 1.4309E+1 | −1.0168E+3 | 1.2999E+4 | −5.9433E+4 |
| 5 | −6.2533E+2 | −1.1294 | 4.2717 | −4.9854E+1 | 1.9993E+2 | −3.1879E+2 |

Lens Data
F = 1.407 mm, f₁ = 1.440 mm, F no = 2.8, ω = 63.9°

| Face Number (Object Point) | r | d | nd | vd |
|---|---|---|---|---|
| 1 (Diaphragm) | 0.000 | −0.050 | | |
| 2 (First Face of First Lens) | 0.441 | 0.272 | 1.52 | 53 |
| 3 (Second Face of First Lens) | 0.844 | 0.281 | | |
| 4 (First Face of Second Lens) | −9.282 | 0.413 | 1.52 | 53 |
| 5 (Second Face of Second Lens) | −4.323 | 0.100 | | |
| 6 (First Face of Cover Glass) | 0.000 | 0.500 | 1.5168 | 64 |
| 7 (Second Face of Cover Glass) | 0.000 | | | |

| Face Number | k | A | B | C | D | E |
|---|---|---|---|---|---|---|
| 2 | −5.1419E−2 | 1.3834E−1 | 9.7663 | −6.6296E+1 | 5.2438E+2 | 0 |
| 3 | 6.8747 | 1.0473 | −2.2221E+1 | 5.8582E+2 | −6.8438E+3 | 4.3812E+4 |
| 4 | 0 | −2.3380 | 2.1296E+1 | −7.5461E+2 | 8.3416E+3 | −3.7206E+4 |
| 5 | −9.2176E+2 | −1.3146 | 6.5726 | −4.7765E+1 | 1.4826E+2 | −1.9567E+2 |

Under such conditions, $r_3/d_3 = -22.450$ was achieved, thereby satisfying the expression (1). $r_3/r_2 = -11.000$ was achieved, thereby satisfying the expression (2). $r_1/r_2 = 0.522$ was achieved, thereby satisfying the expression (3). $f_1/F = 1.024$ was achieved, thereby satisfying the expression (4).

FIG. 11 shows the spherical aberration, astigmatism, and distortion in the imaging lens 1 of the FIFTH EXAMPLE.

According to the result, each of the spherical aberration, astigmatism, and distortion are almost satisfactory. It can be seen from the result that sufficient optical property can be obtained.

Sixth Example

FIG. 12 shows a SIXTH EXAMPLE of the present invention. In the example, as in the imaging lens 1 configured as shown in FIG. 1, a cover glass serving as the filter 5 is disposed between the second face 4b of the second lens 4 and the image-taking surface 6.

The imaging lens 1 of the SIXTH EXAMPLE was set under the following conditions:

Under such conditions, $r_3/d_3 = -30.400$ was achieved, thereby satisfying the expression (1). $r_3/r_2 = -11.000$ was achieved, thereby satisfying the expression (2). $r_1/r_2 = 0.479$ was achieved, thereby satisfying the expression (3). $f_1/F = 1.003$ was achieved, thereby satisfying the expression (4).

FIG. 13 shows the spherical aberration, astigmatism, and distortion in the imaging lens 1 of the SIXTH EXAMPLE.

According to the result, each of the spherical aberration, astigmatism, and distortion are almost satisfactory. It can be seen from the result that sufficient optical property can be obtained.

Seventh Example

FIG. 14 shows a SEVENTH EXAMPLE of the present invention. In the example, as in the imaging lens 1 configured as shown in FIG. 1, a cover glass serving as the filter 5 is disposed between the second face 4b of the second lens 4 and the image-taking surface 6.

The imaging lens 1 of the SEVENTH EXAMPLE was set under the following conditions:

Lens Data
F = 1.457 mm, f₁ = 1.461 mm, F no = 2.8, ω = 62.0°

| Face Number (Object Point) | r | d | nd | vd |
|---|---|---|---|---|
| 1 (Diaphragm) | 0.000 | −0.050 | | |
| 2 (First Face of First Lens) | 0.490 | 0.371 | 1.52 | 53 |
| 3 (Second Face of First Lens) | 1.023 | 0.265 | | |
| 4 (First Face of Second Lens) | −11.256 | 0.370 | 1.52 | 53 |
| 5 (Second Face of Second Lens) | −7.513 | 0.100 | | |
| 6 (First Face of Cover Glass) | 0.000 | 0.500 | 1.5168 | 64 |
| 7 (Second Face of Cover Glass) | 0.000 | | | |

| Face Number | k | A | B | C | D | E |
|---|---|---|---|---|---|---|
| 2 | −3.9529E−1 | −8.6129E−2 | 1.8539E+1 | −2.1700E+2 | 1.2047E+3 | 0 |
| 3 | 3.0263 | 1.1756 | −2.0848E+1 | 7.0444E+2 | −8.5568E+3 | 4.8132E+4 |
| 4 | 0 | −2.4547 | 3.0847E+1 | −1.0554E+3 | 1.1513E+4 | −4.8260E+4 |
| 5 | −2.0040E+3 | −1.0225 | 3.0155 | −3.9916E+1 | 1.6117E+2 | −2.5571E+2 |

| Lens Data |  |  |  |  |
|---|---|---|---|---|
| $F = 1.457$ mm, $f_1 = 1.445$ mm, F no = 2.8, $\omega = 62.0°$ | | | | |
| Face Number (Object Point) | r | d | nd | vd |
| 1 (Diaphragm) | 0.000 | −0.050 | | |
| 2 (First Face of First Lens) | 0.463 | 0.318 | 1.52 | 53 |
| 3 (Second Face of First Lens) | 0.924 | 0.295 | | |
| 4 (First Face of Second Lens) | −10.350 | 0.370 | 1.52 | 53 |
| 5 (Second Face of Second Lens) | −9.197 | 0.100 | | |
| 6 (First Face of Cover Glass) | 0.000 | 0.500 | 1.5168 | 64 |
| 7 (Second Face of Cover Glass) | 0.000 | | | |

| Face Number | k | A | B | C | D | E |
|---|---|---|---|---|---|---|
| 2 | −2.7939E−1 | 1.2834E−1 | 1.2825E+1 | −1.1183E+2 | 6.7759E+2 | 0 |
| 3 | 4.3570 | 1.2665 | −1.6150E+1 | 6.3353E+2 | −8.3565E+3 | 5.9277E+4 |
| 4 | 0 | −2.5804 | 3.1207E+1 | −9.8613E+2 | 1.0354E+4 | −4.2493E+4 |
| 5 | −2.8717E+3 | −1.0546 | 3.6700 | −4.2527E+1 | 1.6279E+2 | −2.4757E+2 |

Under such conditions, $r_3/d_3 = -28.000$ was achieved, thereby satisfying the expression (1). $r_3/r_2 = -11.200$ was achieved, thereby satisfying the expression (2). $r_1/r_2 = 0.501$ was achieved, thereby satisfying the expression (3). $f_1/F = 0.992$ was achieved, thereby satisfying the expression (4).

FIG. 15 shows the spherical aberration, astigmatism, and distortion in the imaging lens 1 of the SEVENTH EXAMPLE.

According to the result, each of the spherical aberration, astigmatism, and distortion are almost satisfactory. It can be seen from the result that sufficient optical property can be obtained.

Eighth Example

FIG. 16 shows a EIGHTH EXAMPLE of the present invention. In the example, as in the imaging lens 1 configured as shown in FIG. 1, a cover glass serving as the filter 5 is disposed between the second face 4b of the second lens 4 and the image-taking surface 6.

The imaging lens 1 of the EIGHTH EXAMPLE was set under the following conditions:

Under such conditions, $r_3/d_3 = -19.100$ was achieved, thereby satisfying the expression (1). $r_3/r_2 = -9.067$ was achieved, thereby satisfying the expression (2). $r_1/r_2 = 0.520$ was achieved, thereby satisfying the expression (3). $f_1/F = 0.998$ was achieved, thereby satisfying the expression (4).

FIG. 17 shows the spherical aberration, astigmatism, and distortion in the imaging lens 1 of the EIGHTH EXAMPLE.

According to the result, each of the spherical aberration, astigmatism, and distortion are almost satisfactory. It can be seen from the result that sufficient optical property can be obtained.

Ninth Example

FIG. 18 shows a NINTH EXAMPLE of the present invention. In the example, as in the imaging lens 1 configured as shown in FIG. 1, a cover glass serving as the filter 5 is disposed between the second face 4b of the second lens 4 and the image-taking surface 6.

The imaging lens 1 of the NINTH EXAMPLE was set under the following conditions:

| Lens Data |  |  |  |  |
|---|---|---|---|---|
| $F = 1.457$ mm, $f_1 = 1.440$ mm, F no = 2.8, $\omega = 62.1°$ | | | | |
| Face Number (Object Point) | r | d | nd | vd |
| 1 (Diaphragm) | 0.000 | −0.050 | | |
| 2 (First Face of First Lens) | 0.448 | 0.297 | 1.52 | 53 |
| 3 (Second Face of First Lens) | 0.861 | 0.284 | | |
| 4 (First Face of Second Lens) | −7.809 | 0.409 | 1.52 | 53 |
| 5 (Second Face of Second Lens) | −6.923 | 0.100 | | |
| 6 (First Face of Cover Glass) | 0.000 | 0.500 | 1.5168 | 64 |
| 7 (Second Face of Cover Glass) | 0.000 | | | |

| Face Number | k | A | B | C | D | E |
|---|---|---|---|---|---|---|
| 2 | −2.6776E−1 | 3.7301E−1 | 9.3675 | −5.1311E+1 | 4.2657E+2 | 0 |
| 3 | 6.6256 | 1.0143 | −2.5480E+1 | 7.8058E+2 | −1.0298E+4 | 6.4370E+4 |
| 4 | 0 | −2.6465 | 2.9742E+1 | −8.9008E+2 | 9.2808E+3 | −3.9391E+4 |
| 5 | −2.2438E+3 | −1.2474 | 6.3901 | −4.8806E+1 | 1.5250E+2 | −1.9740E+2 |

Lens Data
F = 1.457 mm, $f_1$ = 1.441 mm, F no = 2.8, ω = 62.1°

| Face Number (Object Point) | r | d | nd | vd |
|---|---|---|---|---|
| 1 (Diaphragm) | 0.000 | −0.050 | | |
| 2 (First Face of First Lens) | 0.448 | 0.295 | 1.52 | 53 |
| 3 (Second Face of First Lens) | 0.863 | 0.284 | | |
| 4 (First Face of Second Lens) | −7.953 | 0.412 | 1.52 | 53 |
| 5 (Second Face of Second Lens) | −6.899 | 0.100 | | |
| 6 (First Face of Cover Glass) | 0.000 | 0.500 | 1.5168 | 64 |
| 7 (Second Face of Cover Glass) | 0.000 | | | |

| Face Number | k | A | B | C | D | E |
|---|---|---|---|---|---|---|
| 2 | −1.5573E−1 | 2.2703E−1 | 8.4350 | −4.7995E+1 | 3.9172E+2 | 0 |
| 3 | 6.8458 | 8.9702E−1 | −1.9708E+1 | 5.6215E+2 | −7.0028E+3 | 4.417E+4 |
| 4 | 0 | −2.5445 | 2.5350E+1 | −8.0585E+2 | 8.5673E+3 | −3.7038E+4 |
| 5 | −1.9972E+3 | −1.1148 | 4.6036 | −3.7525E+1 | 1.2017E+2 | −1.6143E+2 |

Under such conditions, $r_3/d_3$=−19.300 was achieved, thereby satisfying the expression (1). $r_3/r_2$=−9.221 was achieved, thereby satisfying the expression (2). $r_1/r_2$=0.519 was achieved, thereby satisfying the expression (3). $f_1/F$=0.989 was achieved, thereby satisfying the expression (4).

FIG. 19 shows the spherical aberration, astigmatism, and distortion in the imaging lens 1 of the NINTH EXAMPLE.

According to the result, each of the spherical aberration, astigmatism, and distortion are almost satisfactory. It can be seen from the result that sufficient optical property can be obtained.

Tenth Example

FIG. 20 shows a TENTH EXAMPLE of the present invention. In the example, as in the imaging lens 1 configured as shown in FIG. 1, a cover glass serving as the filter 5 is disposed between the second face 4b of the second lens 4 and the image-taking surface 6.

The imaging lens 1 of the NINTH EXAMPLE was set under the following conditions:

Lens Data
F = 1.457 mm, $f_1$ = 1.442 mm, F no = 2.8, ω = 62.1°

| Face Number (Object Point) | r | d | nd | vd |
|---|---|---|---|---|
| 1 (Diaphragm) | 0.000 | −0.050 | | |
| 2 (First Face of First Lens) | 0.448 | 0.294 | 1.52 | 53 |
| 3 (Second Face of First Lens) | 0.863 | 0.285 | | |
| 4 (First Face of Second Lens) | −8.081 | 0.412 | 1.52 | 53 |
| 5 (Second Face of Second Lens) | −6.965 | 0.100 | | |
| 6 (First Face of Cover Glass) | 0.000 | 0.500 | 1.5168 | 64 |
| 7 (Second Face of Cover Glass) | 0.000 | | | |

| Face Number | k | A | B | C | D | E |
|---|---|---|---|---|---|---|
| 2 | −2.8738E−1 | 4.1980E−1 | 8.8275 | −4.0776E+1 | 3.8791E+2 | 0 |
| 3 | 6.8948 | 8.8174E−1 | −1.8498E+1 | 5.0887E+2 | −6.1397E+3 | 3.8801E+4 |
| 4 | 0 | −2.4847 | 2.3172E+1 | −7.6579E+2 | 8.2271E+3 | −3.5862E+4 |
| 5 | −1.8416E+3 | −1.0461 | 3.7885 | −3.2908E+1 | 1.0793E+2 | −1.4883E+2 |

Under such conditions, $r_3/d_3$=−19.600 was achieved, thereby satisfying the expression (1). $r_3/r_2$=−9.366 was achieved, thereby satisfying the expression (2). $r_1/r_2$=0.519 was achieved, thereby satisfying the expression (3). $f_1/F$=0.989 was achieved, thereby satisfying the expression (4).

FIG. 21 shows the spherical aberration, astigmatism, and distortion in the imaging lens 1 of the TENTH EXAMPLE.

According to the result, each of the spherical aberration, astigmatism, and distortion are almost satisfactory. It can be seen from the result that sufficient optical property can be obtained.

Eleventh Example

FIG. 22 shows an ELEVENTH EXAMPLE of the present invention. In the example, as in the imaging lens 1 configured as shown in FIG. 1, a cover glass serving as the filter 5 is disposed between the second face 4b of the second lens 4 and the image-taking surface 6.

The imaging lens 1 of the NINTH EXAMPLE was set under the following conditions:

Lens Data
F = 1.457 mm, $f_1$ = 1.443 mm, F no = 2.8, ω = 62.1°

| Face Number (Object Point) | r | d | nd | vd |
|---|---|---|---|---|
| 1 (Diaphragm) | 0.000 | −0.050 | | |
| 2 (First Face of First Lens) | 0.448 | 0.294 | 1.52 | 53 |
| 3 (Second Face of First Lens) | 0.862 | 0.285 | | |
| 4 (First Face of Second Lens) | −8.167 | 0.412 | 1.52 | 53 |
| 5 (Second Face of Second Lens) | −6.951 | 0.100 | | |
| 6 (First Face of Cover Glass) | 0.000 | 0.500 | 1.5168 | 64 |
| 7 (Second Face of Cover Glass) | 0.000 | | | |

| Face Number | k | A | B | C | D | E |
|---|---|---|---|---|---|---|
| 2 | −3.0080E−1 | 4.2665E−1 | 9.2379 | −4.4877E+1 | 4.0561E+2 | 0 |
| 3 | 6.8918 | 8.6028E−1 | −1.6965E+1 | 4.6008E+2 | −5.4347E+3 | 3.4834E+4 |
| 4 | 0 | −2.4488 | 2.1835E+1 | −7.3539E+2 | 7.9205E+3 | −3.4654E+4 |
| 5 | −1.9738E+3 | −1.0675 | 4.0456 | −3.4138E+1 | 1.1058E+2 | −1.5071E+2 |

Under such conditions, $r_3/d_3$=−19.800 was achieved, thereby satisfying the expression (1). $r_3/r_2$=−9.472 was achieved, thereby satisfying the expression (2). $r_1/r_2$=0.520 was achieved, thereby satisfying the expression (3). $f_1/F$=0.990 was achieved, thereby satisfying the expression (4). FIG. 23 shows the spherical aberration, astigmatism, and distortion in the imaging lens 1 of the ELEVENTH EXAMPLE.

According to the result, each of the spherical aberration, astigmatism, and distortion are almost satisfactory. It can be seen from the result that sufficient optical property can be obtained.

Twelfth Example

FIG. 24 shows a TWELFTH EXAMPLE of the present invention. In the example, as in the imaging lens 1 configured as shown in FIG. 1, a cover glass serving as the filter 5 is disposed between the second face 4b of the second lens 4 and the image-taking surface 6.

The imaging lens 1 of the NINTH EXAMPLE was set under the following conditions:

Under such conditions, $r_3/d_3$=−20.000 was achieved, thereby satisfying the expression (1). $r_3/r_2$=−8.000 was achieved, thereby satisfying the expression (2). $r_1/r_2$=0.498 was achieved, thereby satisfying the expression (3). $f_1/F$=0.985 was achieved, thereby satisfying the expression (4).

FIG. 25 shows the spherical aberration, astigmatism, and distortion in the imaging lens 1 of the TWELFTH EXAMPLE.

According to the result, each of the spherical aberration, astigmatism, and distortion are almost satisfactory. It can be seen from the result that sufficient optical property can be obtained.

The present invention is not limited to the above-described embodiment. Various modifications can be made as required.

For example, a light-transmitting material other than resin material can be suitably used as the material for the first lens and the second lens.

What is claimed is:

1. An imaging lens used for forming an image of an object on an image-taking surface of an image sensor element, comprising:

Lens Data
F = 1.457 mm, $f_1$ = 1.435 mm, F no = 2.8, ω = 62.0°

| Face Number (Object Point) | r | d | nd | vd |
|---|---|---|---|---|
| 1 (Diaphragm) | 0.000 | −0.050 | | |
| 2 (First Face of First Lens) | 0.463 | 0.322 | 1.52 | 53 |
| 3 (Second Face of First Lens) | 0.929 | 0.290 | | |
| 4 (First Face of Second Lens) | −7.435 | 0.372 | 1.52 | 53 |
| 5 (Second Face of Second Lens) | −7.239 | 0.100 | | |
| 6 (First Face of Cover Glass) | 0.000 | 0.500 | 1.5168 | 64 |
| 7 (Second Face of Cover Glass) | 0.000 | | | |

| Face Number | k | A | B | C | D | E |
|---|---|---|---|---|---|---|
| 2 | −7.6841E−1 | 7.6287E−1 | 1.3571E+1 | −1.0430E+2 | 6.7900E+2 | 0 |
| 3 | −4.9412 | 2.9195 | −2.8484E+1 | 1.0218E+3 | −1.3083E+4 | 8.2402E+4 |
| 4 | 0 | −2.6524 | 3.4298E+1 | −1.1044E+3 | 1.1857E+4 | −4.9659E+4 |
| 5 | −1.7886E+3 | −1.1421 | 4.2544 | −4.6231E+1 | 1.7578E+2 | −2.6741E+2 | in order from an object side to an image surface side, a diaphragm, a first lens that is a meniscus lens having a positive power whose convex surface faces the object side, and a second lens that is a meniscus lens having a positive power whose convex surface faces the image surface side, wherein a condition expressed by the following expression (1) is to be satisfied:

$$-30.5 \leq r_3/d_3 \leq -19 \tag{1}$$

where,
- $r_3$: center radius curvature of the object side face of the second lens
- $d_3$: center thickness of the second lens; and wherein a condition expressed by a following expression (3) is to be further satisfied:

$$0.45 \leq r_1/r_2 \leq 0.55 \tag{3}$$

where,
- $r_1$: center radius curvature of the object side face of the first lens
- $r_2$: center radius curvature of the image surface side face of the first lens.

2. The imaging lens according to claim 1, wherein:
a condition expressed by a following expression (2) is to be further satisfied:

$$-11.5 \leq r_3/r_2 \leq -7 \tag{2}$$

where,
- $r_2$: center radius curvature of the image surface side face of the first lens.

3. The imaging lens according to claim 1 or 2, wherein:
a condition expressed by a following expression (4) is to be further satisfied:

$$0.9 \leq f_1/F \leq 1.1 \tag{4}$$

where,
- $f_1$: focal distance of the first lens
- $F$: focal distance of the entire optical system.

* * * * *